(12) United States Patent
Sakurai et al.

(10) Patent No.: US 10,015,393 B2
(45) Date of Patent: Jul. 3, 2018

(54) IMAGING CONTROL DEVICE, IMAGE PROCESSING DEVICE, IMAGING CONTROLLING METHOD, AND IMAGE PROCESSING METHOD

(71) Applicant: Sony Corporation, Tokyo (JP)

(72) Inventors: Hironari Sakurai, Tokyo (JP); Jun Kimura, Kanagawa (JP); Yuji Ando, Kanagawa (JP); Keisuke Yamaoka, Tokyo (JP); Takefumi Nagumo, Kanagawa (JP); Masashi Eshima, Chiba (JP)

(73) Assignee: SONY CORPORATION, Tokyo (JP)

( * ) Notice: Subject to any disclaimer, the term of this patent is extended or adjusted under 35 U.S.C. 154(b) by 372 days.

(21) Appl. No.: 14/374,648

(22) PCT Filed: Jan. 11, 2013

(86) PCT No.: PCT/JP2013/050421
§ 371 (c)(1),
(2) Date: Jul. 25, 2014

(87) PCT Pub. No.: WO2013/118535
PCT Pub. Date: Aug. 15, 2013

(65) Prior Publication Data
US 2015/0036003 A1 Feb. 5, 2015

(30) Foreign Application Priority Data
Feb. 6, 2012 (JP) ................................. 2012-022993

(51) Int. Cl.
*H04N 5/232* (2006.01)
*H04N 5/225* (2006.01)
(Continued)

(52) U.S. Cl.
CPC .......... *H04N 5/23222* (2013.01); *H04N 1/00* (2013.01); *H04N 5/225* (2013.01);
(Continued)

(58) Field of Classification Search
CPC ...................................................... H04N 5/772
(Continued)

(56) References Cited

U.S. PATENT DOCUMENTS

| 8,582,891 | B2* | 11/2013 | Yim ................... | H04N 1/00408 345/594 |
| 2002/0064297 | A1* | 5/2002 | Brunk .................. | G06T 1/0021 382/100 |
| 2010/0026843 | A1* | 2/2010 | Tezuka ................. | H04N 1/2145 348/231.2 |

FOREIGN PATENT DOCUMENTS

| CN | 1389060 A | 1/2003 |
| CN | 1522052 A | 8/2004 |

(Continued)

OTHER PUBLICATIONS

Nov. 30, 2016, CN communication issued for related CN application No. 201380007301.0.
(Continued)

*Primary Examiner* — Joel Fosselman
(74) *Attorney, Agent, or Firm* — Paratus Law Group, PLLC

(57) ABSTRACT

Provided is an imaging control device including a result receiving unit configured to receive an example image selected by an image processing device used for image processing using image information, the image information being information regarding an image captured by an imaging unit used for image capturing, a selection result transmitting unit configured to transmit information regarding the example image received by the result receiving unit to the image processing device, a setting receiving unit configured
(Continued)

to receive setting information generated by the image processing device based on the example image transmitted from the selection result transmitting unit, the setting information indicating a setting condition when image capturing is performed like the example image, and a setting change unit configured to change an imaging setting of the imaging unit using the setting information received by the setting receiving unit.

20 Claims, 22 Drawing Sheets

(51) Int. Cl.
  *H04N 5/765*  (2006.01)
  *H04N 5/91*   (2006.01)
  *H04N 5/77*   (2006.01)
  *H04N 1/00*   (2006.01)
  *H04N 9/82*   (2006.01)
(52) U.S. Cl.
  CPC ......... *H04N 5/23206* (2013.01); *H04N 5/765* (2013.01); *H04N 5/772* (2013.01); *H04N 5/91* (2013.01); *H04N 9/8205* (2013.01)

(58) Field of Classification Search
  USPC ............................... 348/207.11, 222.1, 231.2
  See application file for complete search history.

(56) References Cited

FOREIGN PATENT DOCUMENTS

| | | |
|---|---|---|
| CN | 101184166 A | 5/2008 |
| JP | 2002-290819 | 10/2002 |
| JP | 2003-333498 | 11/2003 |
| JP | 2006-135515 | 5/2006 |
| JP | 2007-235508 | 9/2007 |
| JP | 2008-288881 | 11/2008 |
| JP | 2009-055088 | 3/2009 |
| JP | 2010-258765 | 11/2010 |

OTHER PUBLICATIONS

Nov. 4, 2015, JP communication issued for related JP application No. 2013-557441.

* cited by examiner

IMAGING CONTROL DEVICE, IMAGE PROCESSING DEVICE, IMAGING CONTROLLING METHOD, AND IMAGE PROCESSING METHOD

CROSS REFERENCE TO PRIOR APPLICATION

This application is a National Stage Patent Application of PCT International Patent Application No. PCT/JP2013/050421 (filed on Jan. 11, 2013) under 35 U.S.C. § 371, which claims priority to Japanese Patent Application No. 2012-022993 (filed on Feb. 6, 2012), which are all hereby incorporated by reference in their entirety.

TECHNICAL FIELD

The present disclosure relates to an imaging control device, an image processing device, an imaging controlling method, and an image processing method.

BACKGROUND ART

There is a technique for supporting a user who attempts to shoot an image using an imaging device such as digital cameras to photograph an image (refer to Patent Literatures 1 and 2, for example). Patent Literature 1 discloses a photographic support system in which imaging information to be used temporarily is generated from a photographed image, and a server retrieves an image close to the temporary imaging information, creates control information used to control an imaging device, and transmits the generated information to the imaging device, thereby providing the pleasure of advanced photography to a viewer. In addition, Patent Literature 2 discloses a photographic support device that uploads a photographed image to a server, sets a photographing condition suitable for photographing a subject image based on the image, and transmits the photographing condition information to a photographing device that has captured the subject image.

CITATION LIST

Patent Literature

Patent Literature 1: JP 2009-55088A
Patent Literature 2: JP 2002-290819A

SUMMARY OF INVENTION

Technical Problem

However, since composition or the like varies with the preference of a photographer, there is a problem that transforming the preference of a photographer into numerical values and automatically narrowing down parameters being presented into one are difficult and a parameter is not necessarily set as the user desires. In addition, if photographed images are all transmitted, there is a problem that the load on the transmission band is increased.

Therefore, the present disclosure is made in view of such problems and provides a novel and improved imaging control device, image processing device, imaging controlling method, and image processing method, capable of providing some appropriate advice on photographing to a user while minimizing the load on a network.

Solution to Problem

According to the present disclosure, there is provided an imaging control device including a result receiving unit configured to receive an example image selected by an image processing device used for image processing using image information, the image information being information regarding an image captured by an imaging unit used for image capturing, a selection result transmitting unit configured to transmit information regarding the example image received by the result receiving unit to the image processing device, a setting receiving unit configured to receive setting information generated by the image processing device based on the example image transmitted from the selection result transmitting unit, the setting information indicating a setting condition when image capturing is performed like the example image, and a setting change unit configured to change an imaging setting of the imaging unit using the setting information received by the setting receiving unit.

According to such a configuration, the result receiving unit receives an example image selected in an image processing device used for image processing using image information that is information regarding an image captured by a imaging unit used for image capturing, and the selection result transmitting unit transmits information regarding the example image received by the result receiving unit to the image processing device. The setting receiving receives setting information, which is generated by the image processing device based on the example image transmitted from the selection result transmitting unit and indicates a setting condition upon imaging like the example image, and the setting change unit changes an imaging setting of the imaging unit using the setting information received by the setting receiving unit. As a result, the imaging control device according to an embodiment of the present disclosure can provide some appropriate advice on photographing to a user while minimizing the load on a network.

According to the present disclosure, there is provided an image processing device including an example image retrieval unit configured to acquire an example image using image information transmitted from an imaging control device used to change an imaging setting of an imaging unit used for image capturing, the image information being information regarding an image captured by the imaging unit, an example image transmitting unit configured to transmit the example image acquired by the example image retrieval unit to the imaging control device, a setting generation unit configured to generate setting information indicating a setting condition when image capturing is performed like the example image, based on information regarding the example image selected by the imaging control device from among the example images transmitted from the example image transmitting unit and transmitted from the imaging control device, and a setting transmitting unit configured to transmit the setting information generated by the setting generation unit to the imaging control device.

According to such a configuration, the example image retrieval unit acquires an example image using image information which is transmitted from an imaging control device used to change an imaging setting of an imaging unit used for image capturing and is information regarding the image captured by the imaging unit, and the example image transmitting unit transmits the example image acquired by the example image retrieval unit to the imaging control device. The setting generation unit generates setting information indicating a setting condition upon imaging like the example image, based on information regarding the example image that is selected by the imaging control device from among the example images transmitted from the example image transmitting unit and then is transmitted from the imaging control device, and the setting transmitting unit transmits the setting information generated by the setting generation unit to the imaging control device. As a result, the image processing device according to an embodiment of the present disclosure can provide some appropriate advice on photographing to a user while minimizing the load on a network.

According to the present disclosure, there is provided an imaging controlling method including receiving an example image selected by an image processing device used for image processing using image information, the image information being information regarding an image captured by a imaging unit used for image capturing, transmitting information regarding the received example image to the image processing device, receiving setting information generated by the image processing device based on the transmitted example image, the setting information indicating a setting condition when image capturing is performed like the example image, and changing an imaging setting of the imaging unit using the received setting information.

According to the present disclosure, there is provided an image processing method including acquiring an example image using image information transmitted from an imaging control device used to change an imaging setting of an imaging unit used for image capturing, the image information being information regarding an image captured by the imaging unit, transmitting the acquired example image to the imaging control device, generating setting information indicating a setting condition when image capturing is performed like the example image, based on information regarding the example image selected by the imaging control device from among the transmitted example images and transmitted from the imaging control device, and transmitting the generated setting information to the imaging control device.

Advantageous Effects of Invention

According to one or more embodiments of the present disclosure as described above, it is possible to provide a novel and improved imaging control device, image processing device, imaging controlling method, and image processing method, capable of providing some appropriate advice on photographing to a user while minimizing the load on a network.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

The description will be made in the following order.
<1. First Embodiment of the Present Disclosure>
[Exemplary Configuration of System]
[Functional Configuration and Operation Examples of Photographing Advice Server and Digital Camera]

<2. Second Embodiment of the Present Disclosure>
[Exemplary Configuration of System]
[Functional Configuration and Operation Examples of Image Recognition Server and Digital Camera]
<3. Summary>

1. First Embodiment of the Present Disclosure

[Exemplary Configuration of System]

Figure 1:
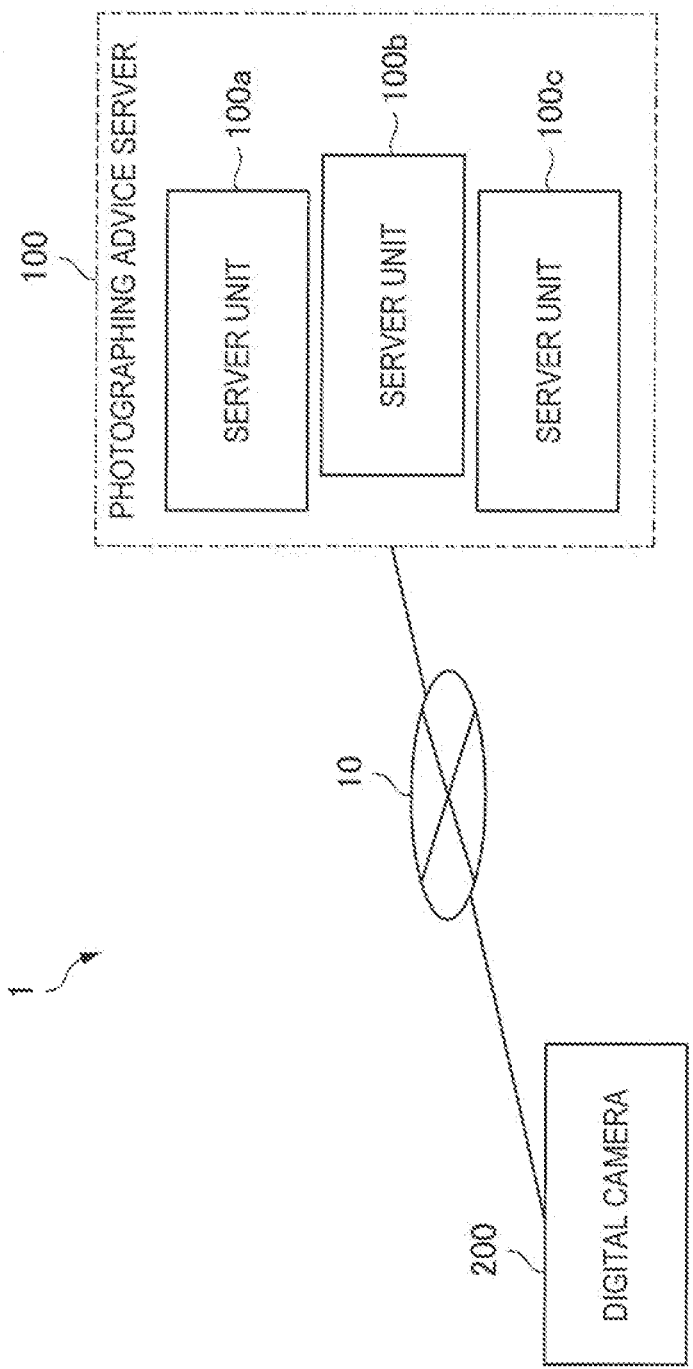
FIG. 1 is a schematic diagram illustrating an exemplary configuration of an information processing system 1 according to a first embodiment of the present disclosure.

An exemplary configuration of an information processing system according to a first embodiment of the present disclosure will be first described. FIG. 1 is a schematic diagram illustrating an exemplary configuration of the information processing system 1 according to the first embodiment of the present disclosure. An exemplary configuration of the information processing system 1 according to the first embodiment of the present disclosure will be described with reference to FIG. 1.

As shown in FIG. 1, the information processing system 1 according to the first embodiment of the present disclosure is configured to include a photographing advice server 100 and a digital camera 200.

The photographing advice server 100 generates advice information for the digital camera 200. This advice information is used when an image is photographed with the digital camera 200. The photographing advice server 100 includes one or more server units. In the example shown in FIG. 1, the photographing advice server 100 consists of three server units 100a, 100b, and 100c. In the following description, the server units 100a, 100b, and 100c are collectively referred to as the photographing advice server 100.

The digital camera 200 is a device that photographs an image electronically. The digital camera 200 is provided with a means of connecting to a network. In the present embodiment, the digital camera 200 functions to communicate with the photographing advice server 100 over the network 10.

In the present embodiment, when an image is photographed with the digital camera 200 or when an image is necessary to be photographed with the digital camera 200, the digital camera 200 transmits predetermined information to the photographing advice server 100 via the network 10. The photographing advice server 100 analyzes the information transmitted from the digital camera 200 and transmits predetermined photographing advice information to the digital camera 200 via the network 10. The user of the digital camera 200 can photograph an image with the digital camera 200 by using the photographing advice information transmitted from the photographing advice server 100.

The information processing system 1 according to the first embodiment of the present disclosure is mainly composed of a local side (digital camera 200) that inputs an image and a server side (photographing advice server 100) that performs an analysis process for photography assistance and a process for create assist information, as shown in FIG. 1.

A database for analysis is used in an image recognition process for photography assistance and in creation of assist information. If a large amount of information can be prepared in the database for analysis, the use of an image obtained at the local side makes it possible to provide photography assistance with high accuracy. In addition, the processing is shared with the server side, and thus an advanced high-speed data processing is possible as compared to the processing at the local side.

As described above, the exemplary configuration of the information processing system 1 according to the first embodiment of the present disclosure has been described with reference to FIG. 1. Subsequently, a functional configuration example of the photographing advice server 100 and the digital camera 200 according to the first embodiment of the present disclosure will be described.

[Functional Configuration and Operation Examples of Photographing Advice Server and Digital Camera]

Figure 2:
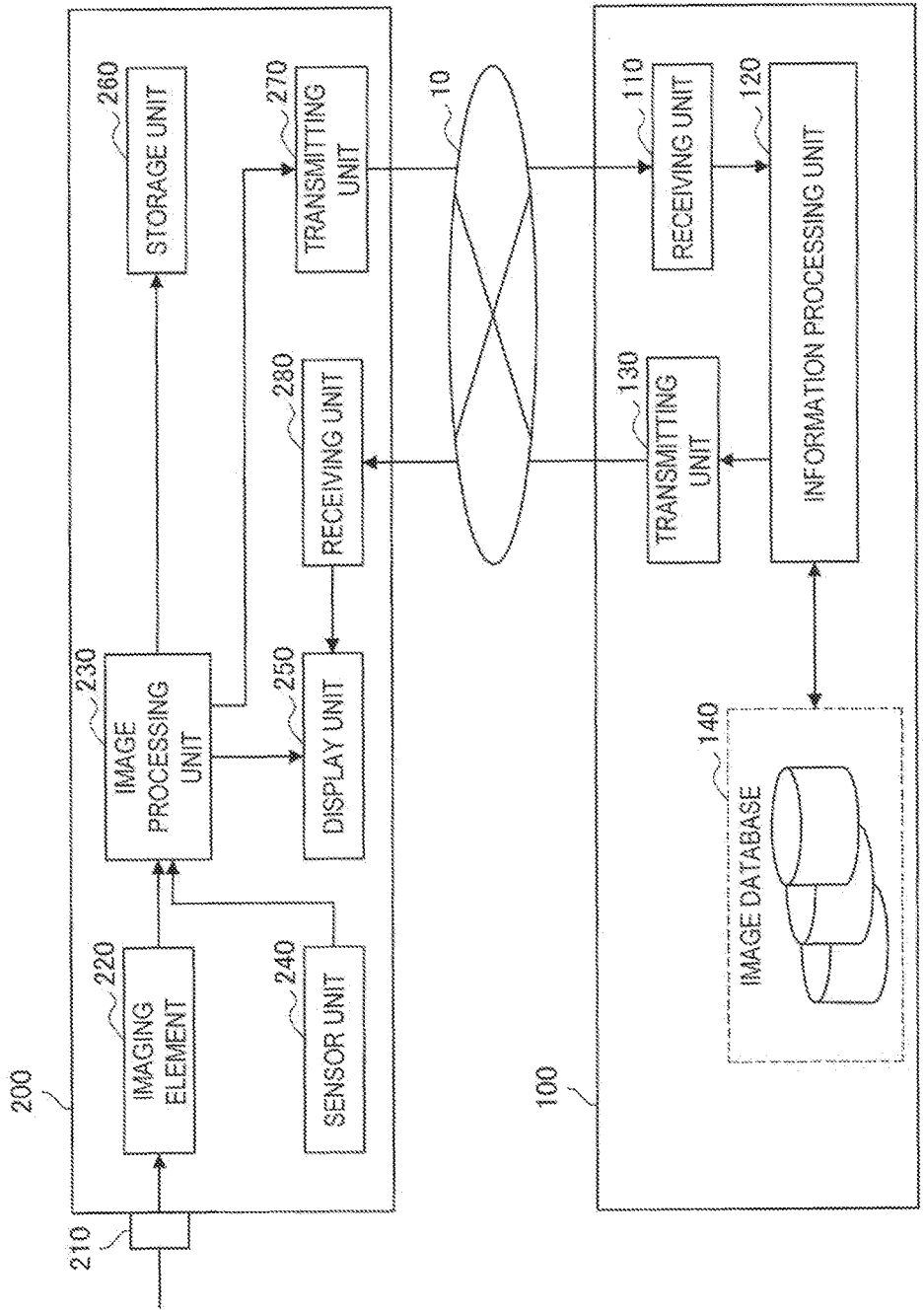
FIG. 2 is a schematic diagram illustrating a functional configuration example of a photographing advice server 100 and a digital camera 200 according to the first embodiment of the present disclosure.

FIG. 2 is a schematic diagram illustrating a functional configuration example of the photographing advice server 100 and the digital camera 200 according to the first embodiment of the present disclosure. A functional configuration example of the photographing advice server 100 and the digital camera 200 according to the first embodiment of the present disclosure will be described with reference to FIG. 2.

As shown in FIG. 2, the photographing advice server 100 according to the first embodiment of the present disclosure is configured to include a receiving unit 110, an information processing unit 120, a transmitting unit 130, and a database 140. In addition, as shown in FIG. 2, the digital camera 200 according to the first embodiment of the present disclosure is configured to include a lens unit 210, an imaging element 220, an image processing unit 230, a sensor unit 240, a display unit 250, a storage unit 260, a transmitting unit 270, and a receiving unit 280.

The receiving unit 110 receives various types of information or data from the digital camera 200 via the network 10. The information processing unit 120 performs various information processing using various types of information or data, which is transmitted from the digital camera 200 and is received by the receiving unit 110 via the network 10. The transmitting unit 130 transmits various types of information or data, which is processed by the information processing unit 120, to the digital camera 200 via the network 10. The database 140 stores various types of data used in information processing of the information processing unit 120.

The photographing advice server 100 according to the present embodiment has the functional configuration as shown in FIG. 2 in a manner that a plurality of server units 100a, 100b, and 100c may be integrated together.

The lens unit 210 concentrates light from a subject and irradiates the imaging element 220 with the light. The imaging element 220 generates an electrical signal from the light concentrated by the lens unit 210. The electrical signal generated by the imaging element 220 becomes image data by causing the image processing unit 230 to perform image processing on the electrical signal.

The image processing unit 230 generates image data by performing an A/D conversion process, a filtering process, or the like on the electrical signal generated by the imaging element 220. Additionally, the image processing unit 230 also performs image processing on the generated image data to generate information to be transmitted to the photographing advice server 100. The image data generated by the image processing unit 230 is displayed on the display unit 250 or is stored in the storage unit 260.

The sensor unit 240 is a sensor that is used to obtain various types of information to be attached to the image data at the time of photographing with the digital camera 200. As an example of the sensor unit 240, a range sensor, a positioning sensor, a gyro sensor, a biosensor, or the like may be provided. The sensor unit 240 supplies information obtained at the time of photographing with the digital camera 200 to the image processing unit 230.

The display unit 250 displays the image data generated by the image processing unit 230 after the digital camera 200 performs the photographing process or displays the photographing advice information transmitted from the photographing advice server 100. An example of the display unit 250 includes a flat panel display such as liquid crystal display or organic EL display.

The storage unit 260 stores the image data generated by the image processing unit 230 after the digital camera 200 performs the photographing process. An example of the storage unit 260 includes a memory card or the like having a predetermined storage capacity.

The transmitting unit 270 transmits information, which is generated by the image processing unit 230 and is to be transmitted to the photographing advice server 100, to the photographing advice server 100 via the network 10. The receiving unit 280 receives various types of information or data generated by the photographing advice server 100 via the network 10.

As described above, the functional configuration example of the photographing advice server 100 and the digital camera 200 according to the first embodiment of the present disclosure has been described with reference to FIG. 2. Subsequently, the functional configuration example of the photographing advice server 100 and the digital camera 200 according to the first embodiment of the present disclosure will be described in more detail.

Figure 3:
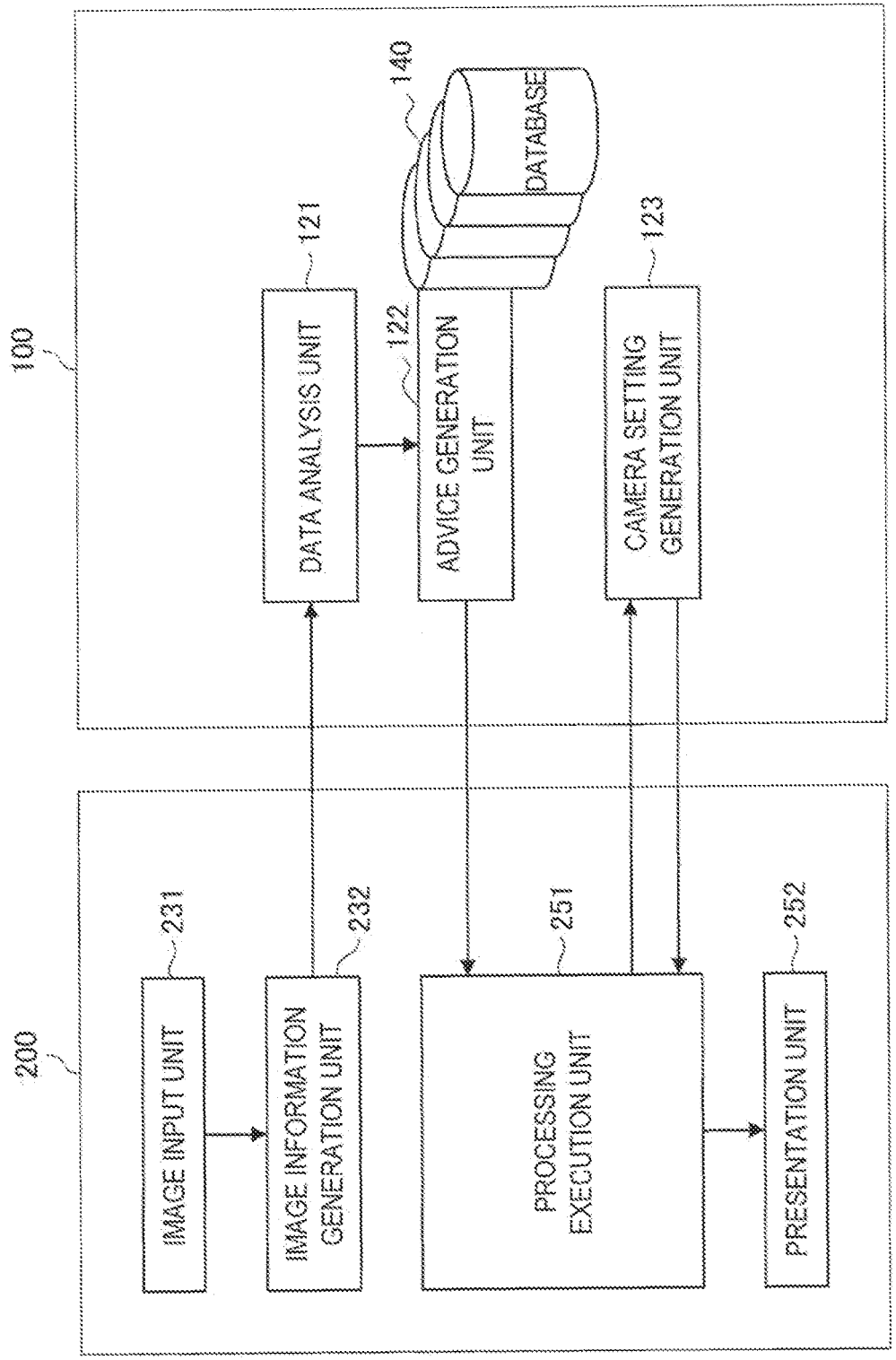
FIG. 3 is a schematic diagram illustrating in more detail the functional configuration of the photographing advice server 100 and the digital camera 200 according to the first embodiment of the present disclosure.

FIG. 3 is a schematic diagram illustrating in more detail the functional configuration of the photographing advice server 100 and the digital camera 200 according to the first embodiment of the present disclosure. The functional configuration of the photographing advice server 100 and the digital camera 200 according to the first embodiment of the present disclosure will be described in more detail with reference to FIG. 3.

As shown in FIG. 3, the photographing advice server 100 is configured to include, a data analysis unit 121, an advice generation unit 122, and a camera setting generation unit 123. In addition, the digital camera 200 is configured to include an image input unit 231, an image information generation unit 232, a processing execution unit 251, and a presentation unit 252.

A functional configuration of the digital camera 200 is first described. The image input unit 231 is inputted with image data to be recognized as a target of photography advice. The image data to be recognized as a target of photography advice is generated by the image processing unit 230. The image input unit 231, when receiving the image data to be recognized as a target of photography advice, supplies the image data to the image information generation unit 232.

The image information generation unit 232 generates image information to be transmitted to the photographing advice server 100 using the image data supplied from the image input unit 231. The image information generated by the image information generation unit 232 will be described in detail later. The image information generated by the image information generation unit 232 is transmitted from the transmitting unit 270 to the photographing advice server 100 via the network 10, and then is used for processing in the photographing advice server 100.

The processing execution unit 251 executes various processing by using the photographing advice information transmitted from the photographing advice server 100 via the network 10. For example, the processing execution unit 251 executes a process of displaying predetermined photographing advice information on the display unit 250 based on the photographing advice information transmitted from the photographing advice server 100. In addition, when the user selects a piece of desired photographing advice based on the photographing advice information displayed on the display unit 250, a process of transmitting information on the selected photographing advice to the photographing advice server 100 via the network 10 is executed.

The presentation unit 252 executes a process of causing the photographing advice information transmitted from the photographing advice server 100 via the network 10 to be displayed on the display unit 250.

Subsequently, a functional configuration of the photographing advice server 100 will be described. The data analysis unit 121 performs a predetermined data analysis process based on the image information transmitted from the digital camera 200 via the network 10. The data analysis unit 121 transmits a result obtained by the data analysis process to the advice generation unit 122.

The advice generation unit 122 generates photographing advice information to be transmitted to the digital camera 200 that has transmitted the image information, based on a result obtained by the data analysis process of the data analysis unit 121. The advice generation unit 122 refers to data stored in the database 140 at the time of the generation of the photographing advice information. The advice generation unit 122, when generating the photographing advice information, transmits the generated photographing advice information to the digital camera 200 that has transmitted the image information. The advice generation unit 122 generates the photographing advice information, for example, by extracting an example image from the database 140. The example image is associated with the image information transmitted from the digital camera 200 via the network 10. The advice generation unit 122 extracts a plurality of example images from the database 140 and presents them to the digital camera 200.

The camera setting generation unit 123 generates photographing settings of the digital camera 200. The photographing settings correspond to the photographing advice information that is transmitted from the photographing advice information 100 to the digital camera 200 and is selected by the digital camera 200. The camera setting generation unit 123, when generating the photographing settings of the digital camera 200 corresponding to the photographing advice information selected by the digital camera 200, transmits the generated photographing settings to the digital camera 200. The processing execution unit 251, when receiving the photographing settings generated by the camera setting generation unit 123, changes the photographing settings of the digital camera 200 based on the received photographing settings. In addition, the processing execution unit 251, when changing the photographing settings of the digital camera 200, may cause the presentation unit 252 to display details of the change on the display unit 250.

As described above, the functional configuration of the photographing advice server 100 and the digital camera 200 according to the first embodiment of the present disclosure has been described in detail with reference to FIG. 3. Subsequently, a configuration of the image information generation unit 232 shown in FIG. 3 will be described in more detail.

Figure 4:
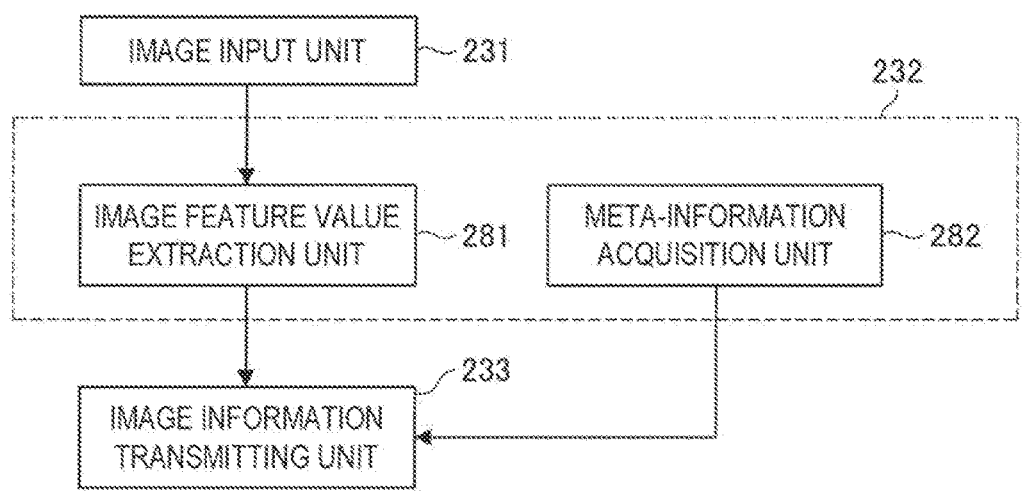
FIG. 4 is a schematic diagram illustrating a configuration of an image information generation unit 232.

FIG. 4 is a schematic diagram illustrating a configuration of the image information generation unit 232. The configuration of the image information generation unit 232 will be described in detail with reference to FIG. 4.

As shown in FIG. 4, the image information generation unit 232 is configured to include an image feature value extraction unit 281 and a meta-information acquisition unit 282.

The image feature value extraction unit 281 extracts a feature value of image data supplied from the image input unit 231. There are various feature values of image data extracted by the image feature value extraction unit 281 and an optimum feature value is selected depending on an object to be recognized. The image feature value extraction unit 281 changes a method of extracting feature values depending on an image supplied from the image input unit 231 or a target to be recognized. The feature value extracted by the image feature value extraction unit 281 is transmitted as image information from the digital camera 200 to the photographing advice server 100 via the network 10.

The image feature value extraction unit 281 extracts feature values of image data and thus it is not necessary for the digital camera 200 to transmit an image itself via the network 10, thereby reducing the amount of data to be transmitted to the network 10. In addition, feature values of image data are extracted by the image feature value extraction unit 281, and as a result, the digital camera 200 is not necessary to transmit an image itself via the network 10, thus it is possible to protect privacy information of an image. Additionally, the extraction of feature values of image data by the image feature value extraction unit 281 prevents the digital camera 200 from transmitting an image itself via the network 10. As a result, the amount of data to be transmitted to the network 10 can be reduced and thus it is possible to cause the photographing advice server 100 to perform recognition processing while reducing the load applied to the network 10.

The meta-information acquisition unit 282 acquires meta-information to be added to the image information that is transmitted from the digital camera 200 to the photographing advice server 100 via the network 200. For example, the meta-information acquisition unit 282 acquires equipment information (device information) or environment information of the digital camera 200. An example of the environment information of the digital camera 200 includes, for example, position information of the digital camera 200 using GPS (global positioning system), parameters of the digital camera 200 such as the time or focal length of the digital camera 200 at the time of photographing, and sensor information related to sensors other than a photographing sensor, such as a range sensor or a biosensor. The meta-information acquired by the meta-information acquisition unit 282 is not, of course, limited to these examples.

The feature values calculated by the image feature value extraction unit 281 and the metadata acquired by the meta-information acquisition unit 282 are collectively transmitted from the image information transmitting unit 233 to the photographing advice information 100 via the network 10.

As described above, the configuration of the image information generation unit 232 has been described. Subsequently, an exemplary operation of the image feature value extraction unit 281 will be described.

Figure 5:
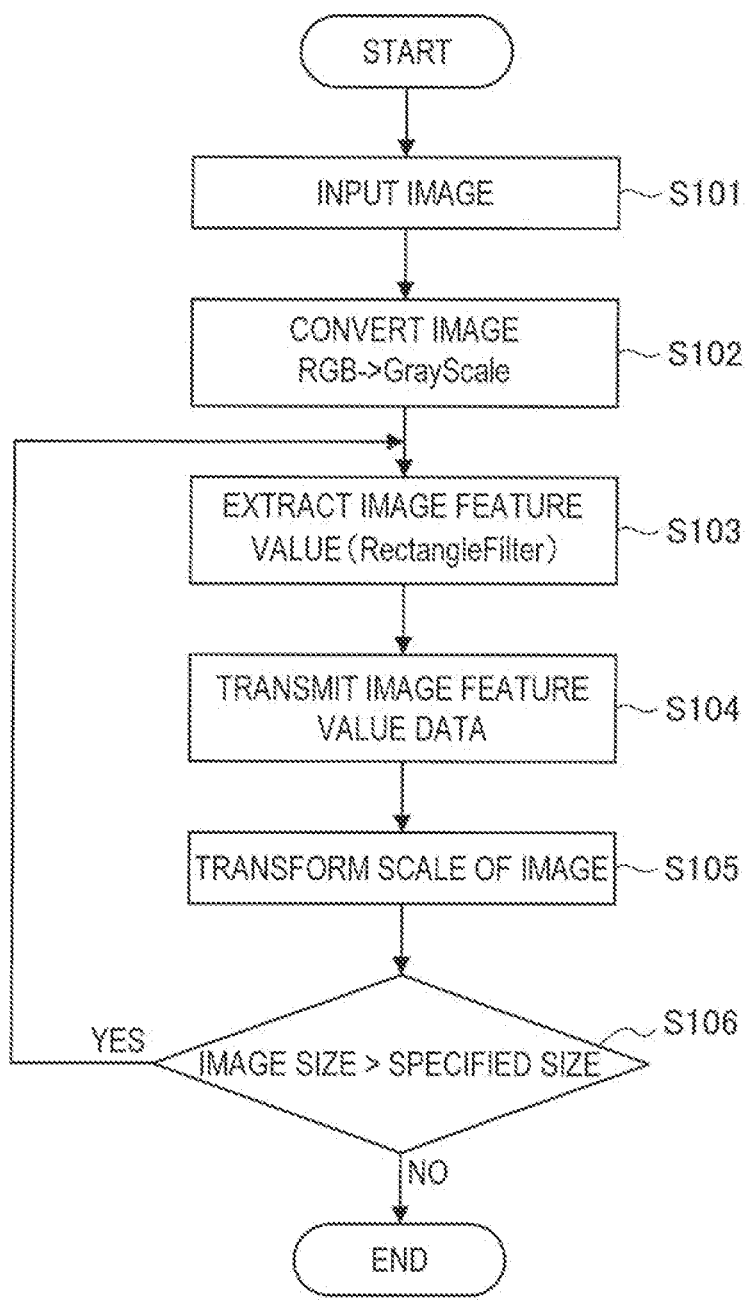
FIG. 5 is a flowchart illustrating an exemplary operation of an image feature value extraction unit 281.
Figure 6:
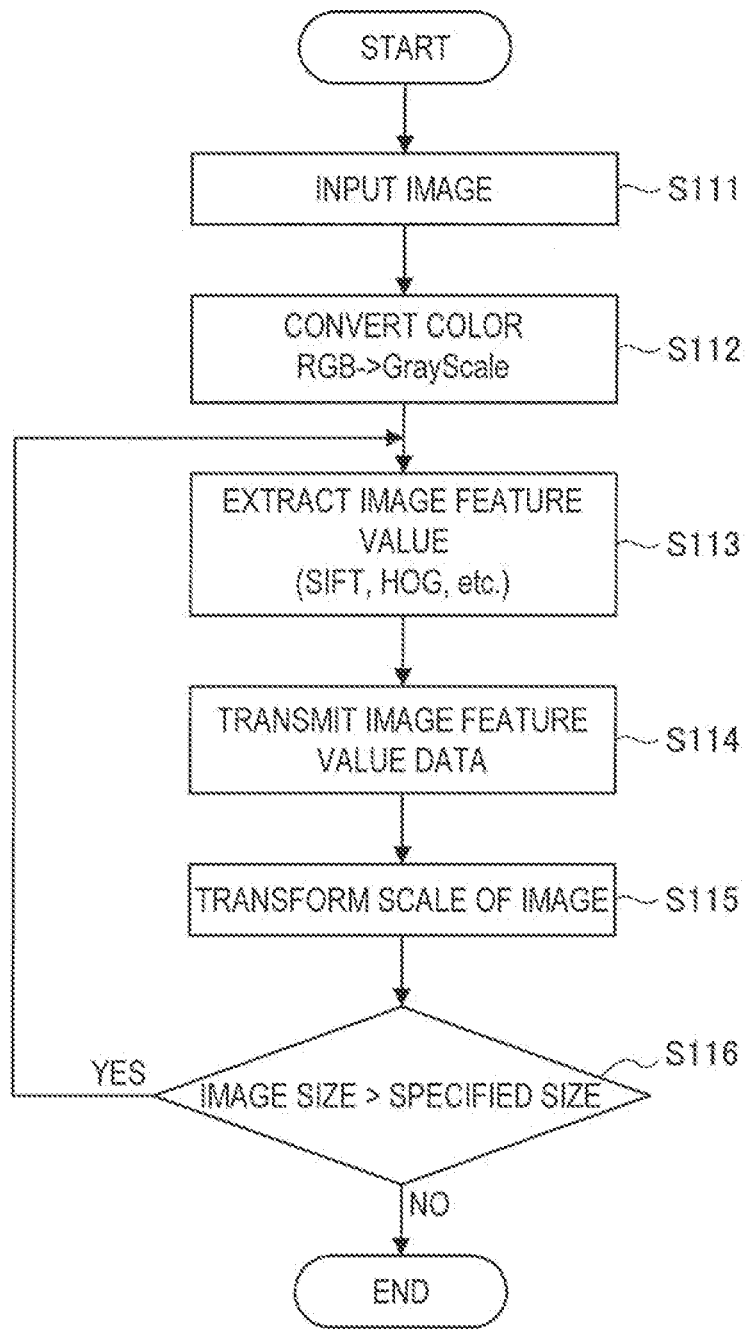
FIG. 6 is a flowchart illustrating an exemplary operation of the image feature value extraction unit 281.

FIGS. 5 and 6 are flowcharts illustrating an exemplary operation of the image feature value extraction unit 281. The flowchart of FIG. 5 shows an operation of the feature value extraction operation in recognizing a human hand. The flowchart of FIG. 6 shows an exemplary operation of the feature value extraction operation in recognizing a car as an example of a general object. An exemplary operation of the image feature value extraction unit 281 will be described with reference to FIGS. 5 and 6.

If image data supplied from the image input unit 231 is inputted to the image feature value extraction unit 281 (step S101 or S111), then the image feature value extraction unit 281 converts the inputted image data (step S102 or S112).

The image feature value extraction unit 281, when recognizing a human hand, performs a recognition process that is independent of color information. Accordingly, the image feature value extraction unit 281 converts the inputted image data from a RGB color image to a grayscale image. If a recognition process that is dependent on color information is performed, the image conversion process of step S102 or S112 may be skipped.

If the image feature value extraction unit 281 converts image data in step S102 or S112, then the image feature value extraction unit 281 performs a process for extracting image feature values of the converted image data (step S103 or S113). The image feature value extraction unit 281, when recognizing a human hand, performs a rectangular filtering (Rectangle) process using the grayscale image obtained in step S102. In addition, the image feature value extraction unit 281, when recognizing a car, performs extraction of image feature values using SIFT (sale-invariant feature transform). HOG (histogram of oriented gradients), or the like based on the grayscale image obtained in step S112.

The method of calculating feature values is not, of course, limited to one approach; various types of calculating methods may be employed. It may be possible to calculate a feature value of one piece of image data using a plurality of methods, transmit the calculated feature value to the photographing advice server 100, and allow the photographing advice server 100 to compare the feature value with data that is stored in the database 140. In addition, it is also possible to distribute the filtering process, for example, by causing the digital camera 200 to perform the first half of the filtering process and the photographing advice server 100 to perform the second half.

If the image feature value extraction unit 281 performs the process of extracting an image feature value of the converted image data in step S103 or S113, then the image information transmitting unit 233 transmits image feature value data extracted by the image feature value extraction unit 281 to the photographing advice server 100 via the network 10 (step S104 or S114).

If the image feature value data extracted by the image feature value extraction unit 281 is transmitted to the photographing advice server 100 in step S104 or S114, then the image feature value extraction unit 281 transforms the scale of an image to accommodate the size of different objects (step S105 or S115). The image scaling is repeated until the size of an object becomes one that is necessary to be recognized.

The size of an image obtained after image scaling is compared to a specified size (step S106 or S116). If the size of the image obtained after image scaling is greater than the specified size, then the image feature value extraction unit 281 returns processing to step S103 or S113 and performs again the process of extracting image feature values. On the other hand, if the size of the image obtained after image scaling is smaller than or equal to the specified size, then the image feature value extraction unit 281 ends the process of extracting image feature values. The number of times of performing the scale transformation of an image may be set as desired by the user.

Figure 7:
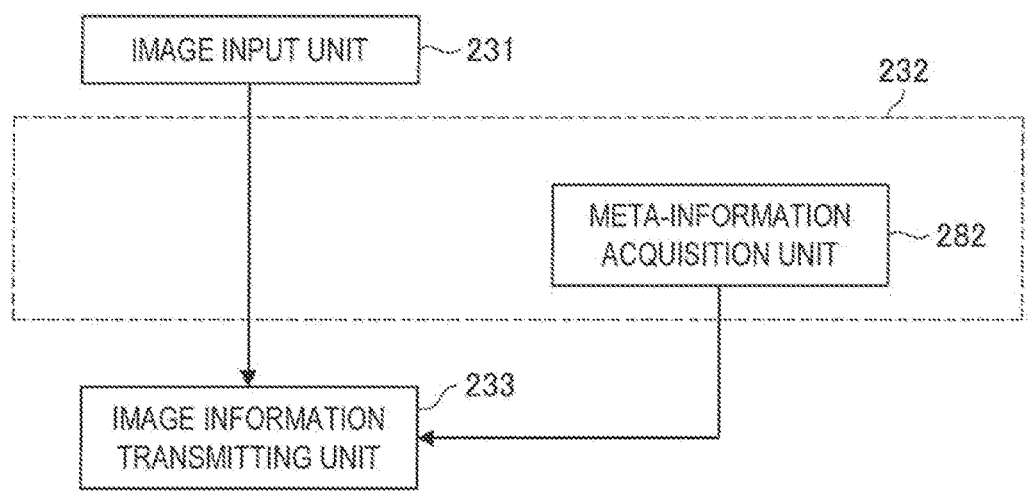
FIG. 7 is a schematic diagram illustrating another configuration of the image information generation unit 232.

The exemplary operation of the image feature value extraction unit 281 has been described with reference to FIGS. 5 and 6. In the configuration of the image information generation unit 232 shown in FIG. 4, the image feature value extraction unit 281 used to extract feature values of image data is provided, but the present disclosure is not limited to this example. FIG. 7 is a schematic diagram illustrating another configuration of the image information generation unit 232. In FIG. 7, the image information generation unit 232 is not provided with the image feature value extraction unit 281. In the example shown in FIG. 7, the digital camera 200 transmits an image obtained by the image input unit 231 to the photographing advice server 100 as image data itself without acquiring feature values. This makes it possible to reduce the load on the recognition process in the digital camera 200. In this case, the recognition process of image data will be performed by the photographing advice server 100.

Figure 8:
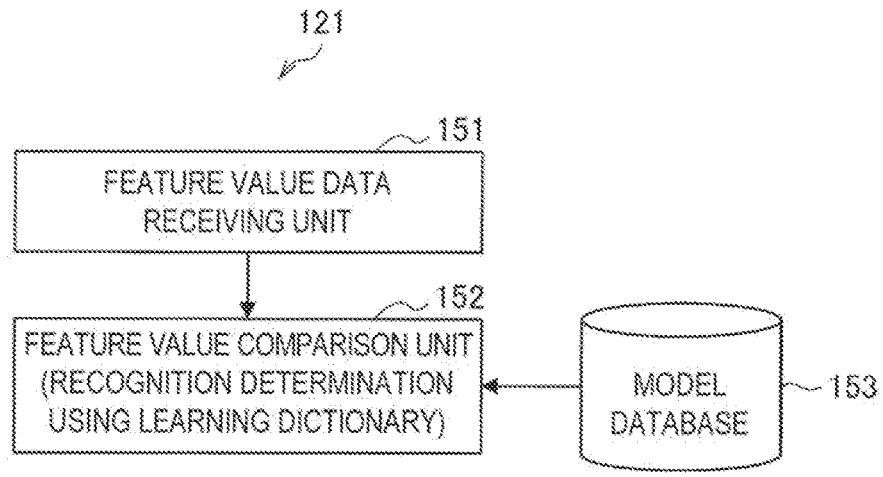
FIG. 8 is a schematic diagram illustrating a configuration of a data analysis unit 121.

Next, the configuration of the data analysis unit 121 of the photographing advice server 100 will be described in detail. FIG. 8 is a schematic diagram illustrating the configuration of the data analysis unit 121. The configuration of the data analysis unit 121 is now described in detail with reference to FIG. 8.

As shown in FIG. 8, the data analysis unit 121 is configured to include a feature value data receiving unit 151 and a feature value comparison unit 152.

The feature value data receiving unit 151 receives feature value data transmitted from the digital camera 200 via the network 10. The feature value data receiving unit 151, when receiving feature value data from the digital camera 200, transmits the received feature value data to the feature value comparison unit 152.

The feature value comparison unit 152 performs comparison between the feature value data received by the feature value data receiving unit 151 and data that is stored in a model database 153 for recognition. An example of the recognition results obtained from the comparison process by the feature value comparison unit 152 may include information related to the type, position in an image, size in an image, composition, and so on of a recognized object.

The comparison process that compares with a database generally tends to become slow, but the comparison process with the database may be performed in the photographing advice server 100. As a result, the comparison process can be performed at high speed and it is not necessary for a local side (digital camera 200) to manage model data stored in a database or the like, so the recognition process of image data can be implemented at the local side with limited resources.

For example, when it is necessary to recognize a human hand, the photographing advice server 100 receives feature value data and then causes the feature value comparison unit 152 to perform the comparison process with the model database 153. When a human hand is recognized, the photographing advice server 100 performs comparison on a plurality of hand shapes (for example, rock, scissors, paper, pinch, and pointing), gestures, and magnitude information (inclination or the like). The photographing advice server 100 is also possible to acquire group information (for example, higher-order recognition results from an image that is a group photograph or an image that people are doing sports) by combining a plurality of processing results as well as information related to a hand in the image.

As described above, the configuration of the data analysis unit 121 has been described with reference to FIG. 8. Subsequently, the configuration of the advice generation unit 122 will be described in detail.

Figure 9:
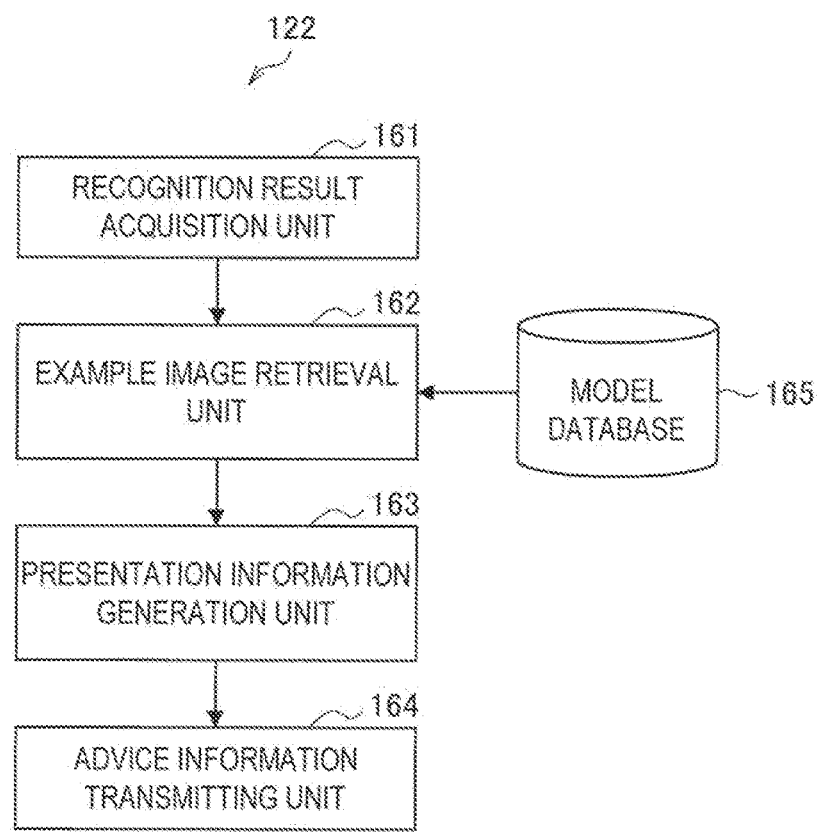
FIG. 9 is a schematic diagram illustrating a configuration of an advice generation unit 122.

FIG. 9 is a schematic diagram illustrating the configuration of the advice generation unit 122. The configuration of the advice generation unit 122 is described in detail with reference to FIG. 9.

As shown in FIG. 9, the advice generation unit 122 is configured to include a recognition result acquisition unit 161, an example image retrieval unit 162, a presentation information generation unit 163, and an advice information transmitting unit 164.

The recognition result acquisition unit 161 acquires the recognition result obtained by the data analysis unit 121. The recognition result acquisition unit 161 supplies the acquired recognition result to the example image retrieval unit 162.

The example image retrieval unit 162 uses the recognition result, which is obtained by the data analysis unit 121 and is supplied from the recognition result acquisition unit 161, to retrieve an image that projects a scene similar to the recognition result from a model database 165 as an example image. The example image retrieval unit 162, when retrieving an image that projects a scene similar to the recognition result as an example image, supplies the example image to the presentation information generation unit 163. The example image retrieval unit 162 may acquire only one example image as a retrieval result, but it is preferable that the example image retrieval unit 162 acquires two or more example images as a retrieval result from the viewpoint that the photographing advice information is provided to the user of the digital camera 200.

The presentation information generation unit 163 narrows down appropriately the retrieval results obtained by the example image retrieval unit 162 according to the conditions when the example image is photographed or the preference of the user of the digital camera 200, and it generates an example image to be presented to the user of the digital camera 200. In this case, it is more preferable for the photographing advice server 100 to prepare a plurality of example images rather than narrowing down to a single scene. If a plurality of example images are prepared in the photographing advice server 100, then the user of the digital camera 200 can have an extensive selection of an example image according to the user's preference. The use of the database on the side of the photographing advice server 100 makes it possible for the photographing advice server 100 to prepare a large number of example images and thus the preference of the user of the digital camera 200 is more likely to be easily reflected.

The presentation information generation unit 163 prepares, as an example image, for example, a plurality of scenes in which the same subject is photographed with different camera settings or positions. For example, there is prepared a photograph in which a distinctive subject such as a tower, a lighthouse, and a skyscraper is photographed with different camera settings such as various positions, composition, illumination, chroma, and diaphragm. In addition, the presentation information generation unit 163 prepares, as an example image, for example, an example image that a professional photographer has taken, and thus it provides the digital camera 200 with an example image so that a photograph can be easily taken with the digital camera 200 as if it is taken by a professional photographer.

Moreover, the presentation information generation unit 163 may also retrieve, as an example image, for example, an event scheduled to be held at a location near a photographing location from metadata including the photographing location or time of an image photographed with the digital camera 200 and may present the event as an example image. For example, if it is found that a display of fireworks will be held around a photographing location from metadata including the photographing location or time of an image photographed with the digital camera 200, the presentation information generation unit 163 presents an example image of frameworks.

The method of allowing an example image prepared by the presentation information generation unit 163 to be more optimized for the user of the digital camera 200 may include, for example, a method of acquiring information related to the position or time where the user of the digital camera 200 is photographing from meta-information and using the acquired information to narrow down the example images. For example, based on information related to the position or time where the user of the digital camera 200 is photographing, the presentation information generation unit 163 may narrow down example images that have been obtained by photographing the same object at the same time in the same place in the past.

Furthermore, if preference data that is detected based on information related to a photographer preferred by the user of the digital camera 200, a photographing history of the user, and history information such as photographs or magazines being usually viewed is available from the metadata transmitted from the digital camera 200, then the presentation information generation unit 163 may present an example image suitable for the user's preference using such information. In addition, the presentation information generation unit 163 may present an example image that is more suitable for the user's preference, based on the metadata transmitted from the digital camera 200 and the database on the side of the photographing advice server 100. For example, the metadata transmitted from the digital camera 200 is set as minimum necessary information such as information (for example, user ID) used to identify a user. The presentation information generation unit 163 can use such information to extract preference data of the user from the database on the side of the photographing advice server 100, and thus it may be possible to present an example image that is suitable for the user's preference.

Moreover, even when there is available personal information such as age or gender of the user of the digital camera 200 based on the metadata transmitted from the digital camera 200, the presentation information generation unit 163 may present an example image that is more suitable for the user's preference using such information. For example, if it is found that the user of the digital camera 200 is a young woman based on the metadata transmitted from the digital camera 200, the presentation information generation unit 163 may prepare an example image so that settings can be changed to make her have a good impression by adjusting a photographic parameter of the digital camera 200. In addition, if biometric information of the user of the digital camera 200 can be obtained based on the metadata transmitted from the digital camera 200, the presentation information generation unit 163 may specify an individual using the biometric information and thus may prepare an example image according to the individual. Additionally, the presentation information generation unit 163 may present an example image that is suitable for the user's preference using personal information such as age or gender of the user based on the metadata transmitted from the digital camera 200 and the database on the side of the photographing advice server 100. For example, the metadata transmitted from the digital camera 200 is set as minimum necessary information such as information (for example, user ID) used to identify a user. The presentation information generation unit 163 can use such information to extract personal information such as age or gender of the user from the database on the side of the photographing advice server 100, and thus it may be possible to present an example image that suitable for the user's preference.

Furthermore, when it is found that an object photographed with the digital camera 200 is a person from the analysis process in the data analysis unit 121, if a particular action or behavior is included in the recognition result, the presentation information generation unit 163 may present an example image obtained by narrowing down settings of the digital camera 200. For example, when the recognition process is performed in the data analysis unit 121 by using a photograph taken with the digital camera 200, if a plurality of hand gestures of scissors (V sign) are recognized, the presentation information generation unit 163 determines that the photograph taken with the digital camera 200 is a "group photograph" or "commemorative photograph", and thus it is possible to reflect this determination result in the camera setting or recommended composition that is suitable for a group photograph.

The advice information transmitting unit 164 transmits the example image generated by the presentation information generation unit 163 to the digital camera 200. The digital camera 200 receives the example image generated by the presentation information generation unit 163 from the advice information transmitting unit 164 and can present the example image generated by the presentation information generation unit 163 to the user.

As described above, the configuration of the advice generation unit 122 has been described in detail with reference to FIG. 9. Subsequently, the configuration of the processing execution unit 251 included in the digital camera 200 according to an embodiment of the present disclosure will be described in detail.

Figure 10:
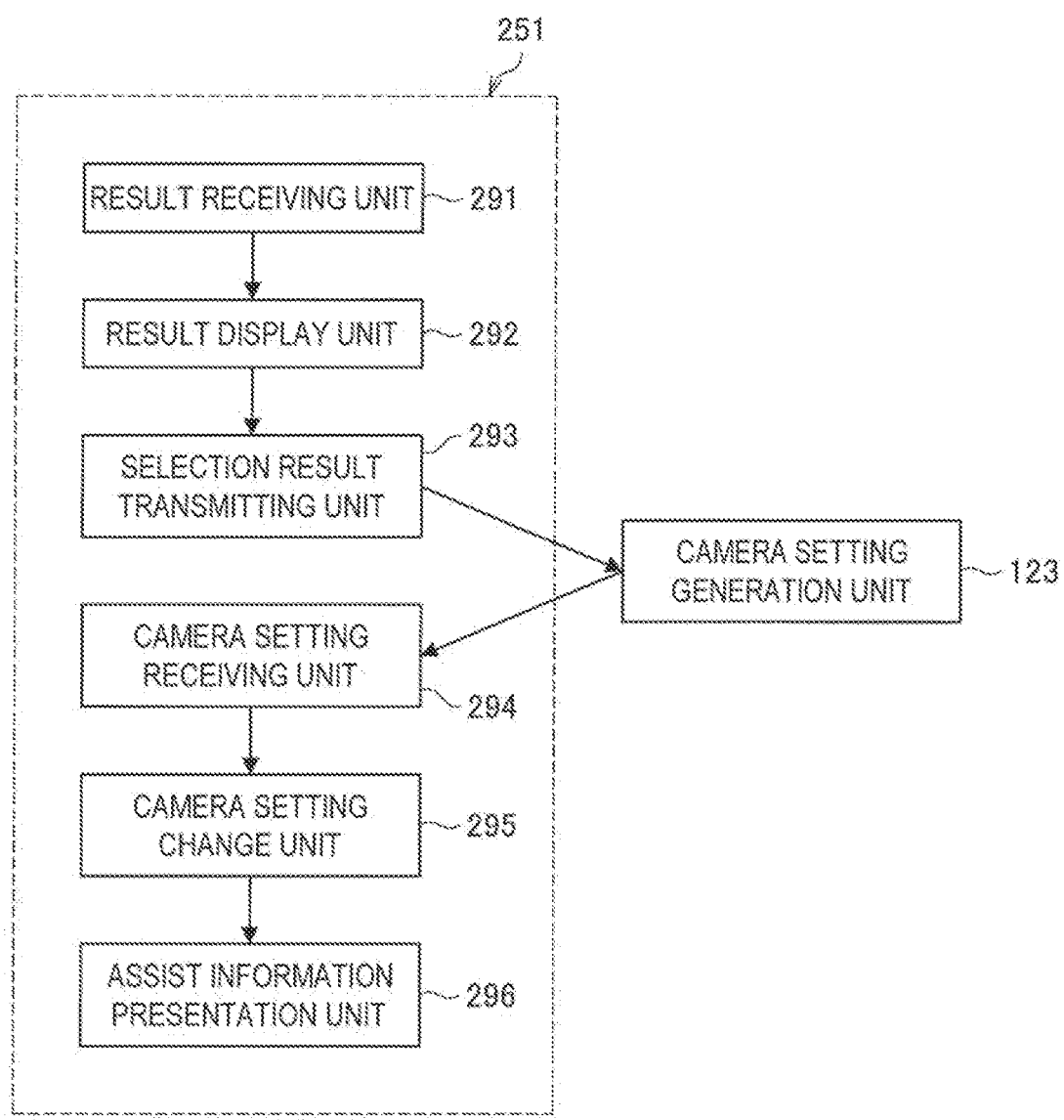
FIG. 10 is a schematic diagram illustrating a configuration of a processing execution unit 251.

FIG. 10 is a schematic diagram illustrating the configuration of the processing execution unit 251 included in the digital camera 200 according to the first embodiment of the present disclosure. The configuration of the processing execution unit 251 included in the digital camera 200 according to the first embodiment of the present disclosure is now described in detail with reference to FIG. 10.

As shown in FIG. 10, the processing execution unit 251 is configured to include a result receiving unit 291, a result display unit 292, a selection result transmitting unit 293, a camera setting receiving unit 294, a camera setting change unit 295, and an assist information presentation unit 296. In addition, in FIG. 10, there is also illustrated the camera setting generation unit 123 of the photographing advice server 100.

The result receiving unit 291 receives an example image transmitted from the photographing advice server 100. The result receiving unit 291, when receiving the example image transmitted from the photographing advice server 100, supplies the received example image to the result display unit 292.

The result display unit 292 executes a process of displaying the example image, which is transmitted from the photographing advice server 100 and is received by the result receiving unit 291, on the display unit 250. The user of the digital camera 200 can select an example image suitable for the user's preference while viewing the example image displayed on the display unit 250 by the result display unit 292. An example of how the example image is displayed on the display unit 250 by the result display unit 292 will be described in detail later.

The selection result transmitting unit 293 transmits information of an example image which is selected by the user of the digital camera 200 from among the example images displayed on the display unit 250 by the result display unit 292 to the photographing advice server 100. The camera setting generation unit 123 of the photographing advice server 100, when receiving information of the example image selected by the user of the digital camera 200 from the selection result transmitting unit 293, generates camera settings of the digital camera 200 corresponding to the received example image and transmits back the camera settings to the digital camera 200. The camera setting generation unit 123 generates camera setting information, such as the camera settings and photographing position, indicating setting conditions at the time of photographing like the selected example image, by using the model and position information of the digital camera 200. An example of the camera settings of the digital camera 200 generated by the camera setting generation unit 123 includes a diaphragm value, white balance, exposure compensation, HDR (high dynamic range), gradation correction, and saturation adjustment.

The camera setting receiving unit 294 receives the camera settings of the digital camera 200, which is generated by the camera setting generation unit 123 and corresponds to the example image selected by the user of the digital camera 200. The camera setting receiving unit 294, when receiving the camera settings of the digital camera 200 generated by the camera setting generation unit 123, supplies the camera settings to the camera setting change unit 295 and the assist information presentation unit 296.

The camera setting change unit 295 changes camera settings of the digital camera 200 based on the camera settings of the digital camera 200, which is generated by the camera setting generation unit 123 and is received by the camera setting receiving unit 294. The camera setting change unit 295 changes, for example, the diaphragm value, white balance, exposure compensation, HDR (high dynamic range), gradation correction, and saturation adjustment of the digital camera 200.

The assist information presentation unit 296 displays a photographing angle and guidance information for guiding the user to a position suitable for photographing on the display unit 250 based on the camera settings of the digital camera 200, which is generated by the camera setting generation unit 123 and is received by the camera setting receiving unit 294. An example of displaying a photographing angle and guidance information used to guide the user to a position suitable for photographing on the display unit 250 will be described in detail later.

As described above, the configuration of the processing execution unit 251 included in the digital camera 200 according to an embodiment of the present disclosure has been described above in detail with reference to FIG. 10. Subsequently, an example of how to display an example image on the display unit 250 by the result display unit 292 will be described.

Figure 11:
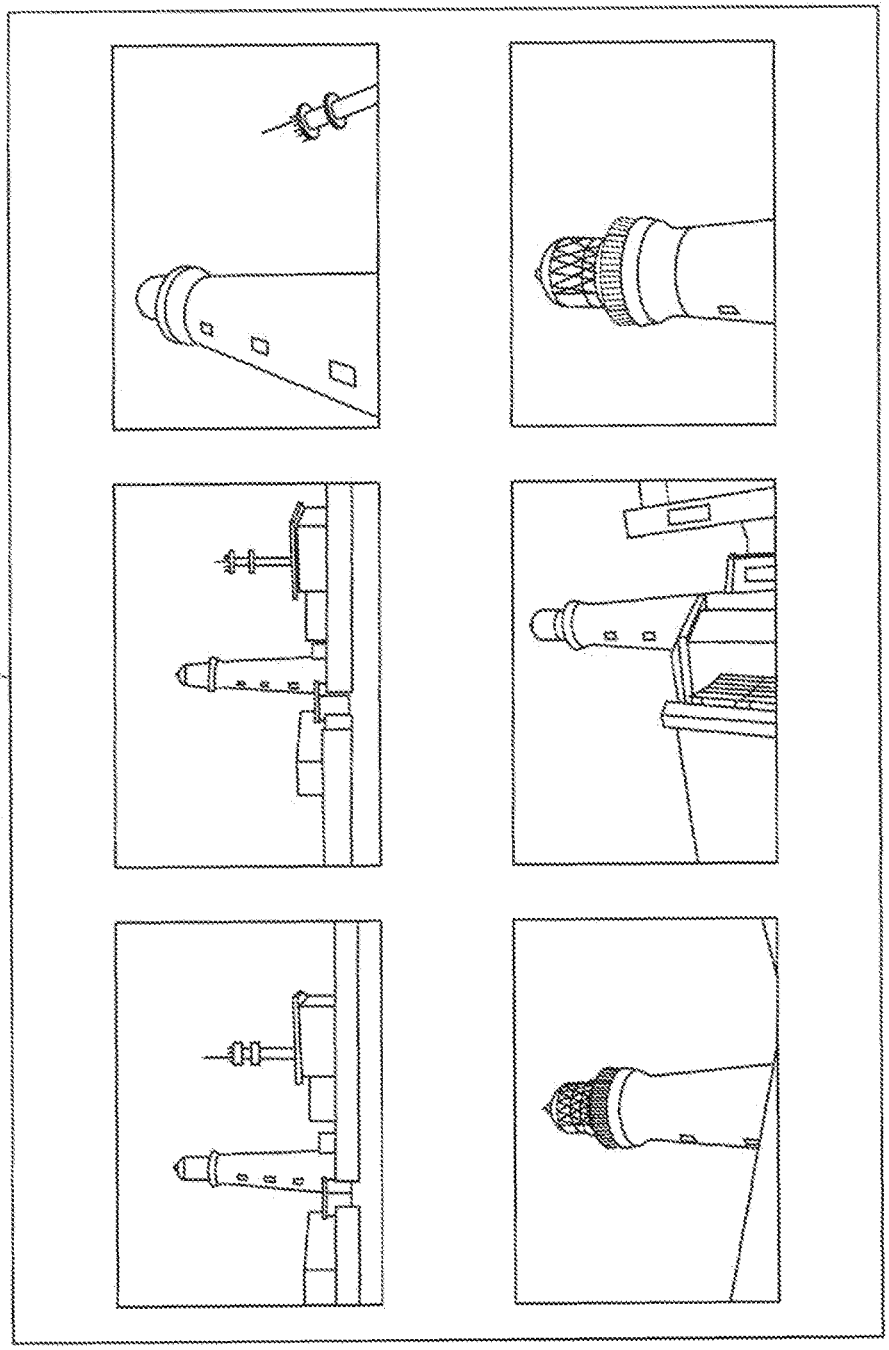
FIG. 11 is a schematic diagram illustrating an example of how an example image is displayed on the display unit 250 by the result display unit 292.
Figure 12:
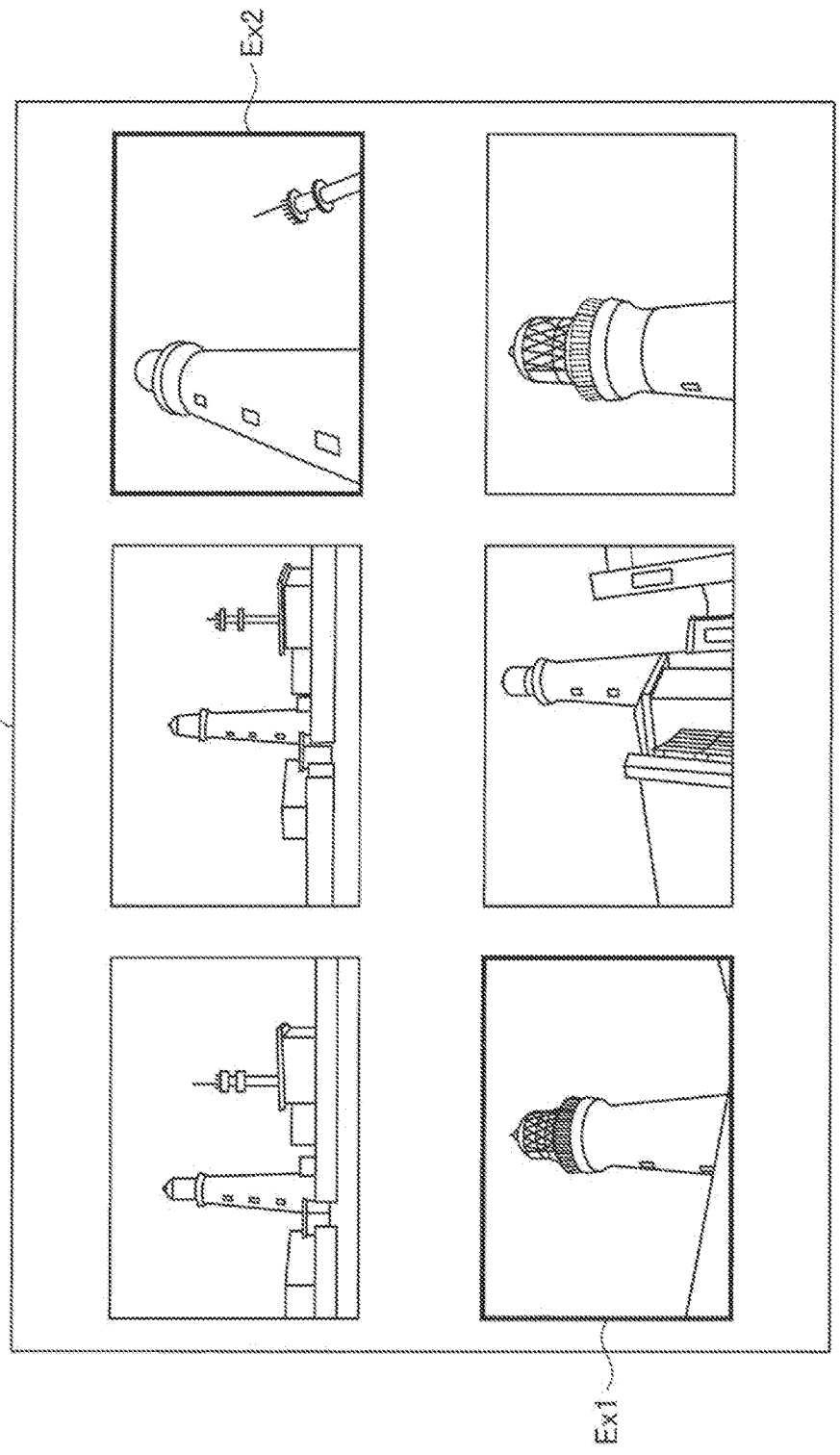
FIG. 12 is a schematic diagram illustrating an example of how an example image is displayed on the display unit 250 by the result display unit 292.
Figure 13:
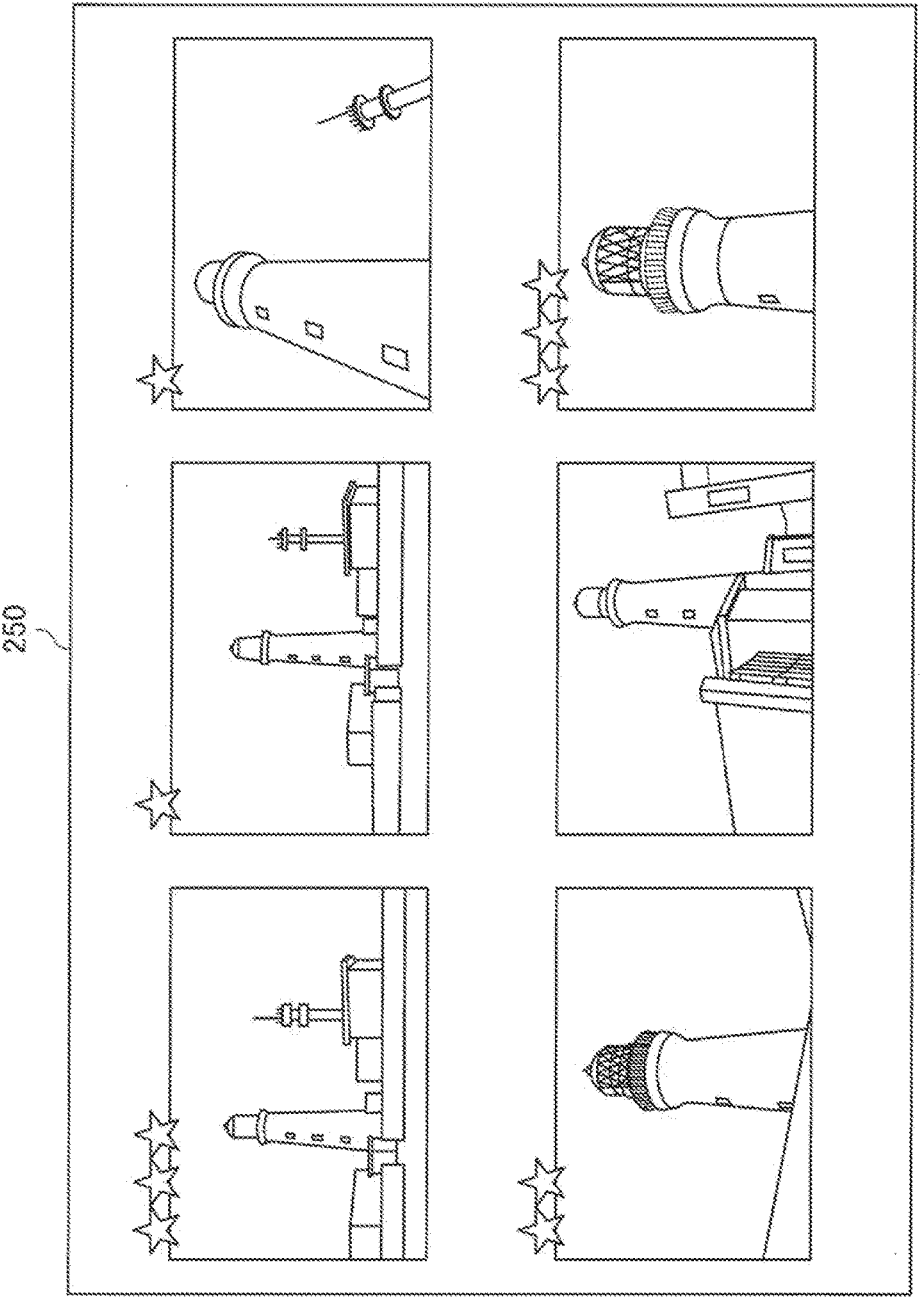
FIG. 13 is a schematic diagram illustrating an example of how an example image is displayed on the display unit 250 by the result display unit 292.

FIGS. 11 to 13 are schematic diagrams illustrating an example of how the result display unit 292 displays an example image on the display unit 250. An example of how an example image is displayed on the display unit 250 by the result display unit 292 is described with reference to FIGS. 11 to 13.

FIG. 11 is an example of how an example image is displayed on the display unit 250 by the result display unit 292 and illustrates the state where six images are displayed on the display unit 250. FIG. 11 illustrates six images in which the same lighthouse is photographed at various angles or with various camera settings. This is an example of example images displayed on the display unit 250. These example images are obtained by photographing a lighthouse by the user of the digital camera 200 using the digital camera 200 and then transmitting feature value information on an image of the lighthouse from the digital camera 200 to the photographing advice server 100 together with metadata.

In this way, the photographing advice server 100 analyzes feature values of an image photographed with the digital camera 200 together with its metadata and thus the photographing advice server 100 specifies a subject that is projected in the image, extracts the image obtained by photographing the subject from a database, and supplies it to the digital camera 200. The user of the digital camera 200 selects an example image suitable for the user's preference while viewing the example image supplied from the photographing advice server 100, and thus the user can obtain camera settings for photographing the example image from the photographing advice server 100. The selection of an example image by the user may be performed by touching a screen with a finger or the like if a touch panel is provided on the display unit 250, or may be performed by using a hard key provided in the digital camera 200.

In FIG. 11, the number of example images displayed on a single screen is six, but the number of example images displayed on a single screen is not limited thereto. In addition, the number of example images presented to the digital camera 200 from the photographing advice server 100 is also not limited to six. If the number of example images presented to the digital camera 200 from the photographing advice server 100 is not fit in one screen, an icon such as "previous page" or "next page" is prepared together with the example image, and the user is allowed to select the icon, thereby changing an example image to be displayed.

Furthermore, there may be a case where the user does not like any of example images displayed on the display unit 250. In consideration of such a case, an icon such as "re-retrieval" may be prepared together with the example image, and if the user selects such an icon, then an instruction for allowing the user to re-retrieve an example image may be transmitted to the photographing advice server 100 from the digital camera 200.

FIG. 12 an example of how an example image is displayed on the display unit 250 by the result display unit 292 and illustrates the state where six images are displayed on the display unit 250, which is similar to FIG. 11. FIG. 12 illustrates the state where a frame indicating that a professional photographer has taken two example images Ex1 and Ex2 is placed around the example images. If a photograph taken by a professional photographer is included in the example images presented by the photographing advice server 100, the result display unit 292 can present the example image so that the user can easily distinguish a photograph taken by a professional photographer from among the presented example images.

FIG. 13 an example of how an example image is displayed on the display unit 250 by the result display unit 292 and illustrates the state where six images are displayed on the display unit 250, which is similar to FIG. 11. FIG. 13 illustrates the state where an asterisk mark indicating the degree of recommendation is assigned to an image presented as an example image. For example, when another user photographs using camera settings corresponding to the presented example image, the information indicating the degree of recommendation may be held in the photographing advice server 100 by transmitting a feedback which indicates whether the user is satisfied with his own photography to the photographing advice server 100.

As described above, the example of how an example image is displayed on the display unit 250 by the result display unit 292 has been described with reference to FIGS. 11 to 13. Subsequently, a process for allowing assist information to be presented to the display unit 250 by the assist information presentation unit 296 will be described.

Figure 14:
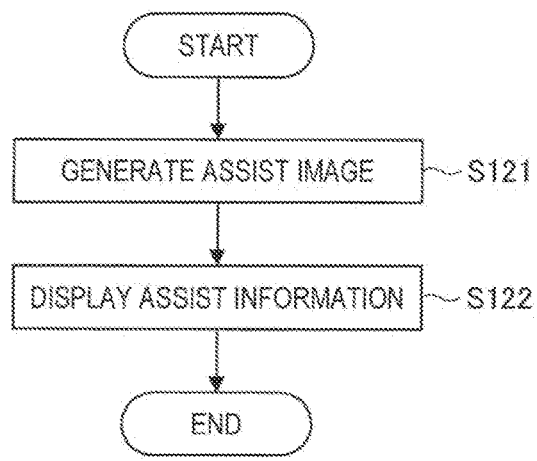
FIG. 14 is a schematic diagram illustrating a presentation process for allowing assist information to be presented to the display unit 250 by an assist information presentation unit 296.

FIG. 14 is a schematic diagram illustrating a presentation process for allowing assist information to be presented to the display unit 250 by the assist information presentation unit 296. A presentation process for allowing assist information to be presented to the display unit 250 by the assist information presentation unit 296 is described with reference to FIG. 14.

The assist information presentation unit 296 generates an assistance image used to cause a photographing angle and guidance information for guiding the user to a position suitable for photographing to be displayed on the display unit 250, based on the camera settings of the digital camera 200 which is generated by the camera setting generation unit 123 and is received by the camera setting receiving unit 294 (step S121). If an assistance image is generated in step S121, then the assist information presentation unit 296 displays the generated assistance image on the display unit 250 as assist information (step S122).

Figure 15:
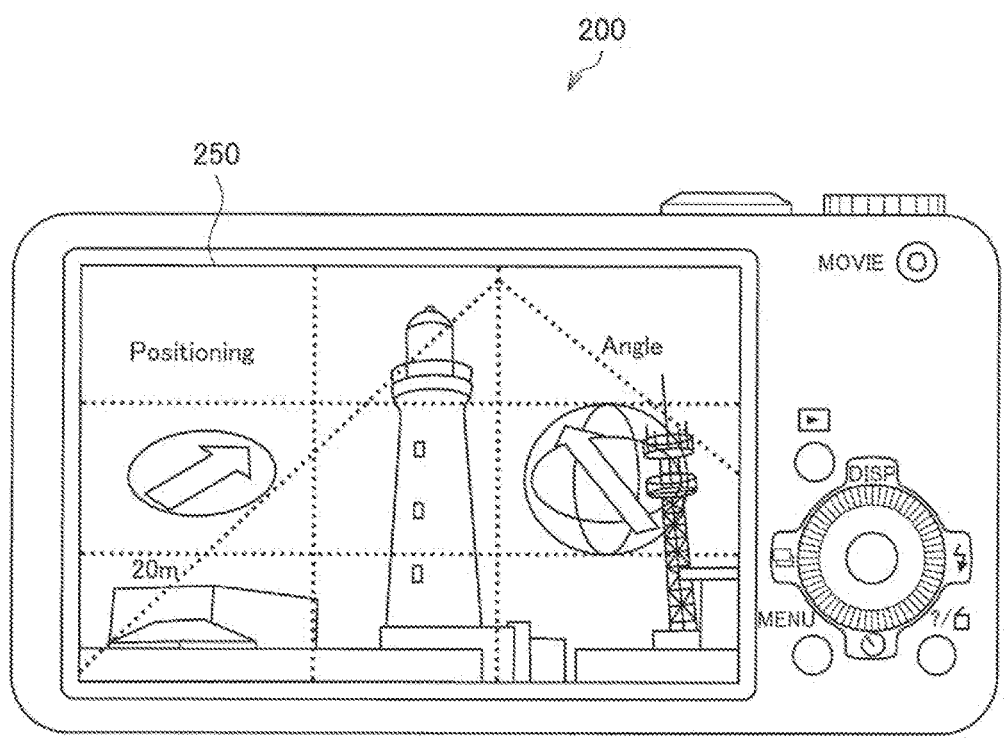
FIG. 15 is a schematic diagram illustrating an example of how assist information generated by the assist information presentation unit 296 is displayed on the display unit 250.

FIG. 15 is a schematic diagram illustrating an example of how assist information generated by the assist information presentation unit 296 is displayed on the display unit 250. FIG. 15 illustrates an example in which the assist information presentation unit 296 creates the direction, distance, and photographing angle to a photographing position as an image of arrow, a character, and an image of arrow, respectively, and these pieces of information are superimposed on an image being photographed with the digital camera 200 using augmented reality (AR) technology, then the resulting image is displayed on the display unit 250. If the user of the digital camera 200 changes the direction or position of the digital camera 200 in the state of holding the digital camera 200, the sensor unit 240 detects the change and the assist information presentation unit 296 changes information related to the direction, distance, and angle to the photographing position depending on the change.

In this way, displaying assist information on the display unit 250 makes it possible for the user of the digital camera 200 to be guided to the position and angle that is most suitable for photography of the selected example image.

As described above, the presentation process for allowing assist information to be presented to the display unit 250 by the assist information presentation unit 296 has been described with reference to FIG. 14. However, the photographing assist information that is displayed on the display unit 250 is not limited to such an example. Subsequently, another presentation process for allowing assist information to be presented to the display unit 250 by the assist information presentation unit 296 will be described.

Figure 16:
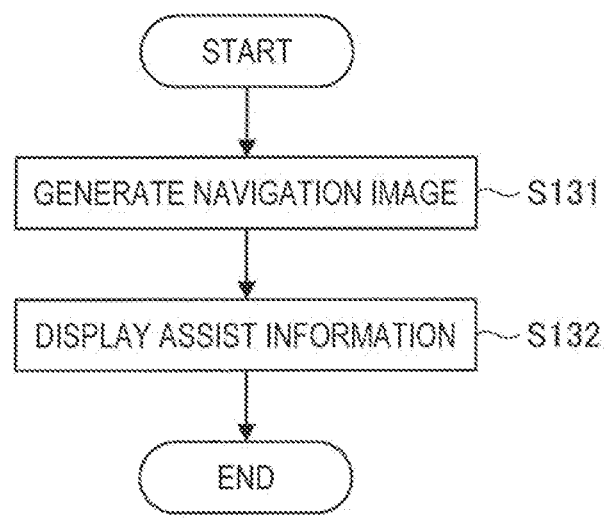
FIG. 16 is a schematic diagram illustrating another presentation process for allowing assist information to be presented to the display unit 250 by the assist information presentation unit 296.

FIG. 16 is a schematic diagram illustrating another presentation process for allowing assist information to be presented to the display unit 250 from the assist information presentation unit 296. The another presentation process for allowing assist information to be presented to the display unit 250 from the assist information presentation unit 296 is described with reference to FIG. 16.

The assist information presentation unit 296 generates a navigation image used to cause a photographing angle and guidance information for guiding the user to a position suitable for photographing to be displayed on the display unit 250, based on the camera settings of the digital camera 200 which is generated by the camera setting generation unit 123 and is received by the camera setting receiving unit 294 (step S131). If a navigation image is generated in step S131, then the assist information presentation unit 296 displays the generated navigation image on the display unit 250 as assist information (step S132).

Figure 17:
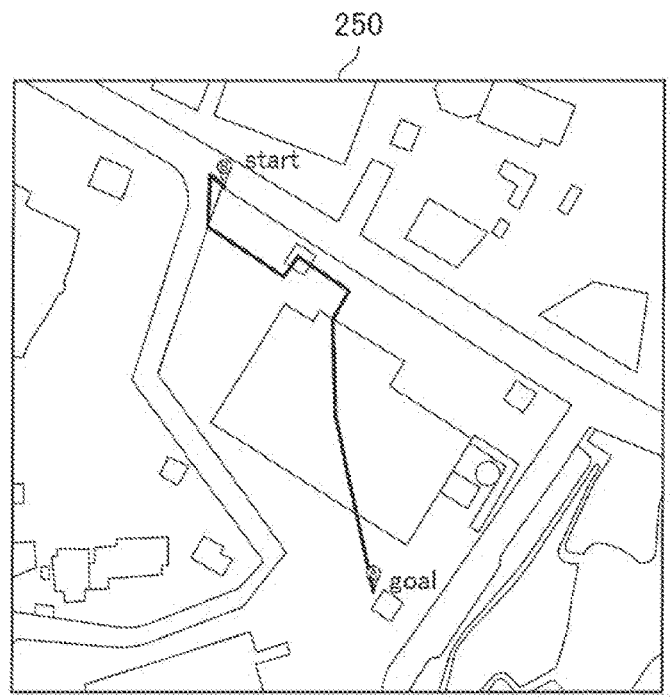
FIG. 17 is a schematic diagram illustrating an example of how assist information generated by the assist information presentation unit 296 is displayed on the display unit 250.

FIG. 17 is a schematic diagram illustrating an example of how the assist information generated by the assist information presentation unit 296 is displayed on the display unit 250. FIG. 17 illustrates an example in which a map screen is displayed on the display unit 250 as a navigation image and information related to a current location and a photographing position corresponding to the example image selected by the user is further displayed. The display of such assist information on the display unit 250 allows the user of the digital camera 200 to be guided to the photographing position.

Figure 18:
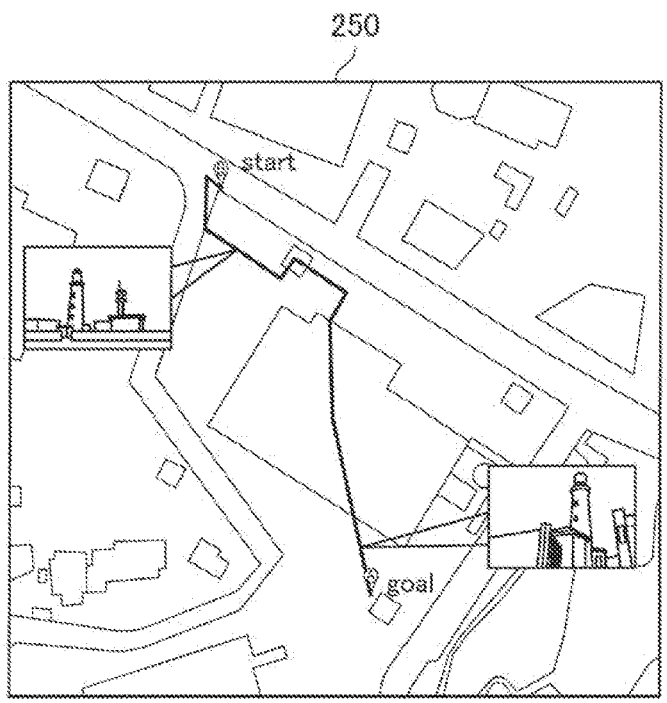
FIG. 18 is a schematic diagram illustrating an example of how assist information generated by the assist information presentation unit 296 is displayed on the display unit 250.

If there is a photographing position of another example image presented from the photographing advice server 100 to the digital camera 200 on the way from a current location to a photographing position corresponding to the example image selected by the user, the assist information presentation unit 296 may cause the display unit 250 to display a fact that the other example image has been photographed at the photographing position. FIG. 18 is a schematic diagram illustrating an example of how assist information generated by the assist information presentation unit 296 is displayed on the display unit 250. FIG. 18 illustrates an example in which a navigation image is displayed in a manner similar to that shown in FIG. 17, and if there is another example image on the way of the path, then a photographing position of the other example image is also displayed.

The assist information used to guide the user of the digital camera 200 to the photographing position is not limited the example described above. For example, it may be possible to guide the user to an optimum photographing position using sound. In addition, for example, it is possible to guide the user of the digital camera 200 to an optimum photographing position by vibrating the digital camera 200 in accordance with the direction of movement and by allowing the user to feel that the user is guided to the direction the user wants.

As described above, the other presentation process for allowing assist information to be presented to the display unit 250 from the assist information presentation unit 296 has been described with reference to FIG. 16.

In accordance with the first embodiment of the present disclosure as described above, when an image is photographed with the digital camera 200, the photographing advice server 100 connected to the digital camera 200 via the network generates photographing advice information using information of feature values of the image. The digital camera 200 receives the photographing advice information from the photographing advice server 100 and displays the photographing advice information on the display unit 250. The example image obtained by the photographing advice server 100 from the database 140 is transmitted to the digital camera 200 from the photographing advice server 100 as photographing assist information.

When the user of the digital camera 200 selects one example image from among example images displayed on the display unit 250, the photographing advice server 100 generates a camera setting suitable when the selected example image is to be photographed with the digital camera 200 depending on the user's selection.

The photographing advice server 100 (a cloud server) is used for an assist in photographing with the digital camera 200, and thus it is possible to use a large database on a cloud or to present a plurality of example images which are appropriate to the photographing environment. This makes it possible for the photographing advice server 100 and the digital camera 200 to reflect the user's preference in photographing assistance of the digital camera 200 with high accuracy.

2. Second Embodiment of the Present Disclosure

In the first embodiment of the present disclosure, in order to assist photographing with the digital camera 200, the photographing advice server 100 generates photographing advice information and supplies the generated photographing advice information to the digital camera 200. In a second embodiment of the present disclosure, there will be described a technology in which an image photographed by a digital camera is analyzed in a server, the analyzed result is transmitted back to the digital camera, and then a result obtained by recognizing the image photographed by the digital camera is displayed on the digital camera.

[Exemplary Configuration of System]

Figure 19:
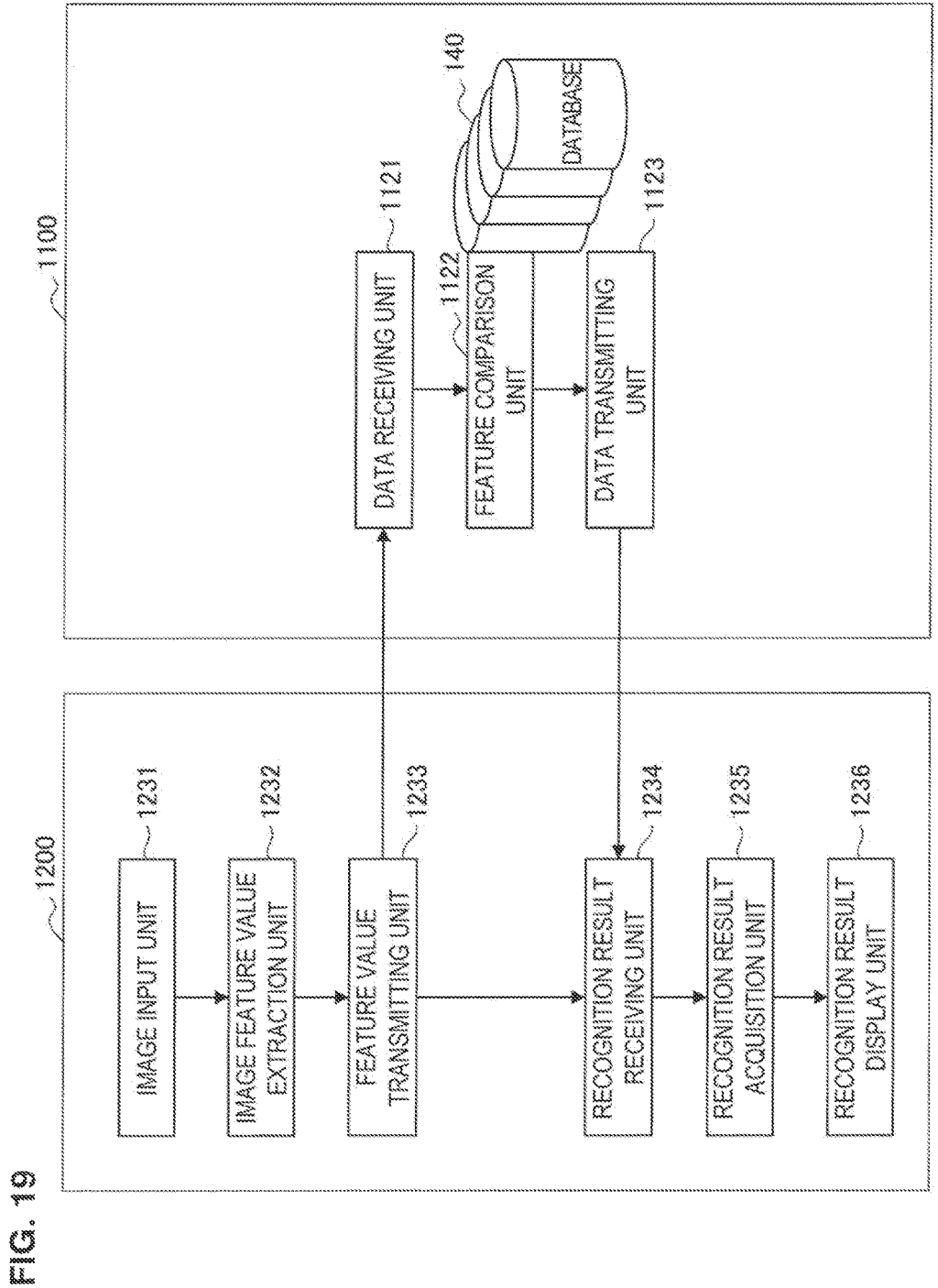
FIG. 19 is a functional configuration example of an image recognition server 1100 and a digital camera 1200 according to a second embodiment of the present disclosure.

FIG. 19 is a schematic diagram illustrating an exemplary functional configuration of an image recognition server 1100 and a digital camera 1200 according to the second embodiment of the present disclosure. It is assumed that the image recognition server 1100 and the digital camera 1200 according to the second embodiment of the present disclosure are the same in configuration as the photographing advice server 100 and the digital camera 200 according to the first embodiment of the present disclosure, respectively. An exemplary functional configuration of the image recognition server 1100 and the digital camera 1200 according to the second embodiment of the present disclosure is described with reference to FIG. 19.

As shown in FIG. 19, the image recognition server 1100 is configured to include a data receiving unit 1121, a feature comparison unit 1122, and a data transmitting unit 1123. In addition, the digital camera 1200 is configured to include an image input unit 1231, an image feature value extraction unit 1232, a feature value transmitting unit 1233, a recognition result receiving unit 1234, a recognition result acquisition unit 1235, and a recognition result display unit 1236.

A functional configuration of the digital camera 1200 is first described. The image input unit 1231 is inputted with image data to be subjected to image recognition. The image data to be subjected to image recognition is generated, for example, by the image processing unit 230 shown in the first embodiment of the present disclosure. The image input unit 1231, when receiving the image data to be subjected to image recognition, supplies the image data to the image feature value extraction unit 1232.

The image feature value extraction unit 1232 executes a process for extracting feature values of an image using the image data supplied from the image input unit 1231. The image feature value extraction unit 1232 transmits information on the extracted feature value to the feature value transmitting unit 1233.

The feature value transmitting unit 1233 transmits feature value information of the image extracted by the image feature value extraction unit 1232 to the image recognition server 100.

The recognition result receiving unit 1234 receives information on the result obtained by performing image recognition in the image recognition server 1100 using the feature value information of the image transmitted from the feature value transmitting unit 1233 to the image recognition server 1100. The recognition result receiving unit 1234, when receiving information on the result obtained by image recognition from the image recognition server 1100, transmits the received recognition result to the recognition result acquisition unit 1235.

The recognition result acquisition unit 1235 acquires information on the result that is obtained by performing image recognition in the image recognition server 1100 and is received by the recognition result receiving unit 1234. The recognition result acquisition unit 1235, when acquiring the information on the image recognition result obtained by performing image recognition in the image recognition server 1100, transmits the acquired information to the recognition result display unit 1236.

The recognition result display unit 1236 displays the information on the result that is obtained by performing image recognition in the image recognition server 1100 and is acquired by the recognition result acquisition unit 1235.

Next, a functional configuration of the image recognition server 1100 is described. The data receiving unit 1121 receives data transmitted from the digital camera 1200. When feature value information of the image extracted by the image feature value extraction unit 1232 is transmitted from the feature value transmitting unit 1233 to the image recognition server 1100, the data receiving unit 1121 receives the feature value information of the image. The data receiving unit 1121, when receiving the feature value information of the image, transmits the received information to the feature comparison unit 1122.

The feature comparison unit 1122 compares the feature value information of the image received by the data receiving unit 1121 to data stored in the database 140. The feature comparison unit 1122 transmits a result obtained by the comparison to the data transmitting unit 1123.

The data transmitting unit 1123 transmits data to the digital camera 1200. The data transmitting unit 1123, when acquiring the comparison result obtained by comparing between the feature value information of the image received by the data receiving unit 1121 and data stored in the database 140 from the feature comparison unit 1122, transmits information on the comparison result to the digital camera 1200.

In this way, the extraction of feature values of an image is performed by the digital camera 1200 and the comparison between the extracted feature value and data stored in the database is performed by the image recognition server 1100, and thus it is possible to obtain a comparison result with high accuracy by comparison with data stored in the database 140 while reducing the load on the comparison process in the digital camera 1200.

As described above, the exemplary functional configuration of the image recognition server 1100 and the digital camera 1200 according to the second embodiment of the present disclosure has been described with reference to FIG. 19. Subsequently, an exemplary operation of the image recognition server 1100 and the digital camera 1200 according to the second embodiment of the present disclosure will be described.

[Functional Configuration and Operation Examples of Image Recognition Server and Digital Camera]

Figure 20:
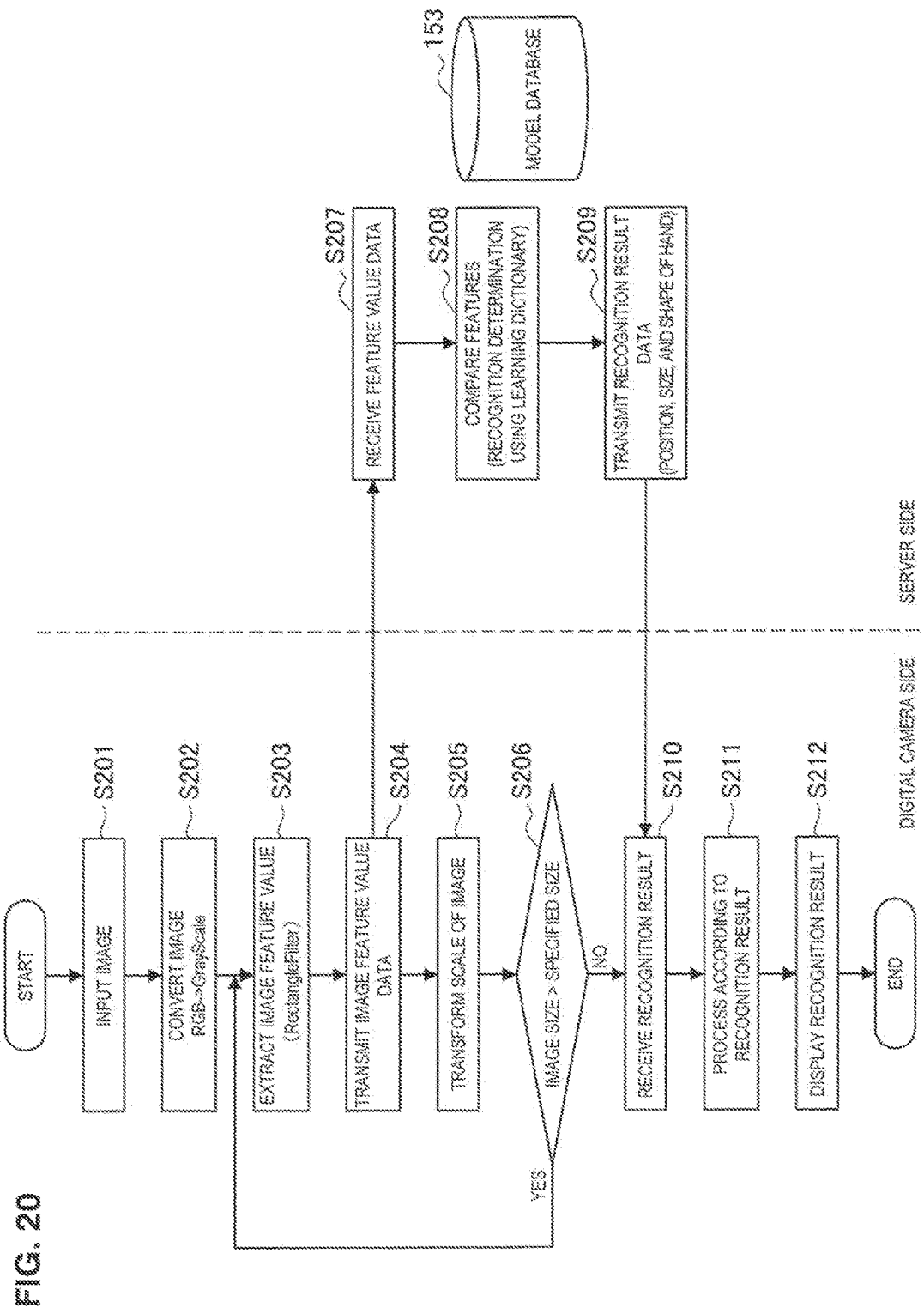
FIG. 20 is a schematic diagram illustrating an exemplary operation of the image recognition server 1100 and the digital camera 1200 according to the second embodiment of the present disclosure.
Figure 21:
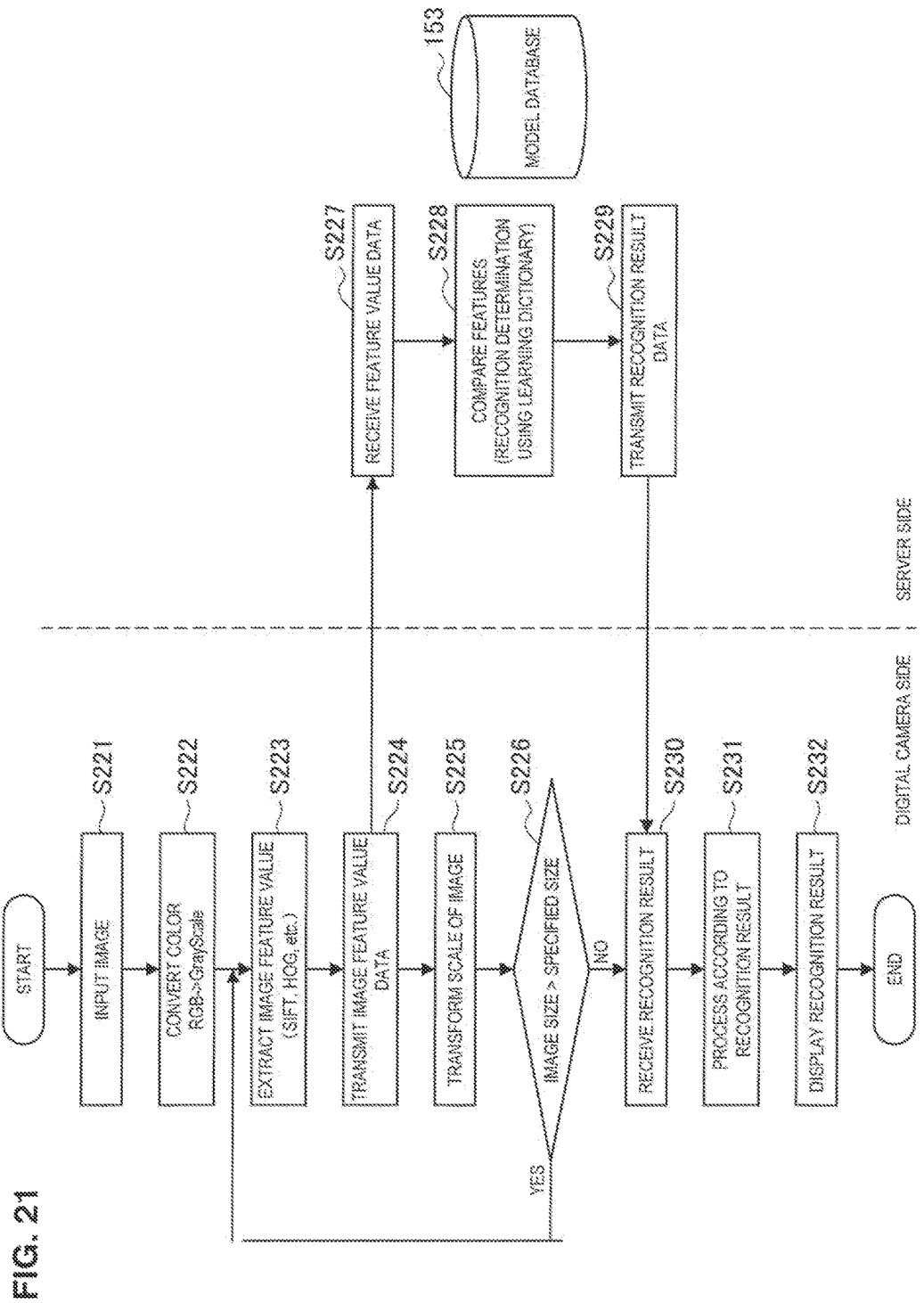
FIG. 21 is a schematic diagram illustrating an exemplary operation of the image recognition server 1100 and the digital camera 1200 according to the second embodiment of the present disclosure.

FIGS. 20 and 21 are schematic diagrams illustrating an exemplary operation of the image recognition server 1100 and the digital camera 1200 according to the second embodiment of the present disclosure. The flowchart shown in FIG. 20 illustrates an example of a feature value extraction operation at the time of recognition of a human hand, and the flowchart shown in FIG. 21 illustrates an example of a feature value extraction operation at the time of recognition of a car as a general object. An operation of the image recognition server 1100 and the digital camera 1200 according to the second embodiment of the present disclosure is described with reference to FIGS. 20 and 21.

When the image data supplied from the image input unit 1231 is inputted to the image feature value extraction unit 1232 (step S201 or S221), the image feature value extraction unit 1232 converts the inputted image data (step S202 or S222). The image feature value extraction unit 1232 performs a recognition process that is independent of color information at the time of recognition of a human hand. Accordingly, the image feature value extraction unit 1232 converts the inputted image data from a RGB color image to a grayscale image. If a recognition process dependent on color information is performed, the image conversion process in step S202 or S222 may be skipped.

If the image feature value extraction unit 1232 converts the image data in step S202 or S222, then the image feature value extraction unit 1232 performs a process for extracting image feature values of the converted image data (step S203 or S223). The image feature value extraction unit 1232, when recognizing a human hand, performs a rectangular filtering (Rectangle) process using the grayscale image obtained in step S202. In addition, the image feature value extraction unit 1232, when recognizing a car, performs extraction of image feature values using SIFT (scale-invariant feature transform), HOG (histogram of oriented gradients), or the like based on the grayscale image obtained in step S222.

The method of calculating feature values is not, of course, limited to one approach; various types of calculating methods may be employed. It may be possible to calculate a feature value of one piece of image data using a plurality of calculating methods, transmit the calculated feature value to the image recognition server 1100, and allow the image recognition server 1100 to compare the feature value with data stored in the database 140. In addition, it also may be possible to distribute the process by causing the digital camera 1200 to perform the first half of the filtering process and the image recognition server 1100 to perform the process of the second half.

If the image feature value extraction unit 1232 performs the process of extracting an image feature value of the converted image data in step S203 or S223, then the feature value transmitting unit 1233 transmits image feature value data extracted by the image feature value extraction unit 1232 to the image recognition server 1100 via the network 10 (step S204 or S224).

If the image feature value data extracted by the image feature value extraction unit 1232 is transmitted to the image recognition server 1100 in step S204 or S224, the image feature value extraction unit 1232 transforms the scale of an image to accommodate the size of different objects (step S205 or S225). The image scaling is repeated until the size of an object becomes one that is it is necessary to be recognized.

The size of an image obtained after image scaling is performed is compared to a specified size (step S206 or S226). If the size of the image obtained after image scaling is greater than the specified size, then the image feature value extraction unit 1232 returns processing to step S203 or S223 and performs again the process of extracting image feature values. On the other hand, if the size of the image obtained after image scaling is smaller than or equal to the specified size, then the image feature value extraction unit 1232 ends the process of extracting image feature values, and the digital camera 1200 waits for the result obtained by image recognition in the image recognition server 1100. The number of times of performing the scale transformation of an image may be set as desired by the user.

If the data receiving unit 1121 of the image recognition server 1100 receives feature value data of an image from the digital camera 1200 (step S207 or S227), the image recognition server 1100 performs recognition determination by causing the feature comparison unit 1122 to compare between feature value information of the image received by the data receiving unit 1121 and data stored in the database 140 (step S208 or S228). Then, the image recognition server 1100 causes the data transmission unit 1123 to transmit the recognition result obtained by the feature comparison unit 1122 to the digital camera 1200 (step S209 or S229).

The digital camera 1200, when receiving the recognition result transmitted from the image recognition server 1100 (step S210 or S230), executes a process corresponding to the received recognition result (step S211 or S231). The process corresponding to the recognition result includes, for example, a process for converting the recognition result received from the image recognition server 1100 to information to be used in the digital camera 1200. For example, the digital camera 1200 can use the recognition result received from the image recognition server 100 to execute various types of processes including composition determination using the position of a hand in an image, specification of autofocus, start, play and stop of a self-timer, and photographing advice. An example of recognizing a hand in an image includes a method in which photographing may be performed automatically by recognizing a peace sign of the hand or composition of a group photograph may be specified automatically using position information of a plurality of hands.

If the digital camera 1200 executes the process corresponding to the received recognition result in step S211 or S231 as described above, then the digital camera 1200 displays the recognition result on a screen as necessary (step S212 or S232). Displaying the recognition result obtained by the image recognition server 1100 on a screen makes it possible for the digital camera 1200 to feedback the recognition result obtained by the image recognition server 1100 to the user.

As described above, the operation of the image recognition server 1100 and the digital camera 1200 according to the second embodiment of the present disclosure has been described with reference to FIGS. 20 and 21. In this way, the digital camera 1200 according to the second embodiment of the present disclosure extracts feature value information of a photographed image and transmits it to the image recognition server 1100, and thus the image recognition server 1100 executes the recognition process using feature value information transmitted from the digital camera 1200.

In this way, the digital camera 1200 (local side) converts an image to feature values and thus it is not necessary to transmit an image itself, which enables the recognition process in consideration of privacy. In addition, the amount of data to be transmitted on the network can be reduced, and thus it is possible to perform the recognition process by applying a low load onto the network. Additionally, the comparison process with the database having generally slow processing ability can be performed on the side of the image recognition server 1100 (client side), and thus it is possible to perform the process at high speed. Further, information regarding a model database is not necessary to be managed by a local side, and hence the recognition process can be implemented at the local side with limited resources.

3. Summary

As described above, in the embodiments of the present disclosure, the processing is shared between the digital camera and the server (client side), and thus the image recognition process and a process associated with the image recognition process become possible without applying a load to the digital camera.

In the first embodiment of the present disclosure, the digital camera 200 extracts a photographed image or feature value information obtained from the photographed image and transmits it to the photographing advice server 100, and then the photographing advice server 100 retrieves an example image based on the image or feature values of the image transmitted from the digital camera 200 and presents the example image to the digital camera 200. When the example image presented by the photographing advice server 100 is selected by the user, the digital camera 200 transmits information regarding the selected example image to the photographing advice server 100, and the photographing advice server 100 generates camera settings used to allow the digital camera 1200 to take a photograph like the example image selected in the digital camera 200 and transmits the camera settings to the digital camera 200. This enables the photographing advice server 100 to retrieve an example image and generate camera settings of the digital camera 200 corresponding to the example image without applying a load to the process to be performed by the digital camera 200.

Furthermore, in the second embodiment of the present disclosure, the digital camera 1200 extracts a photographed image or feature value information obtained from the photographed image and transmits it to the image recognition server 1100, and then the image recognition server 1100 performs a recognition process of the image based on the image or feature values of the image transmitted from the digital camera 200 and transmits the recognition result to the digital camera 1200. This enables the image recognition server 1100 to perform the image recognition process and the digital camera 1200 to execute various types of processes corresponding to the image recognition result obtained by the image recognition server 1100 without applying a load to the process to be performed by the digital camera 1200.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, the data transmission and reception to be performed between a device for photographing an image and a device for analyzing the image using peer-to-peer (P2P) connectivity may enable the process of analyzing an image or the process of generation of photographing advice information as described above to be performed. For example, if one device has higher processing capability than the other one, the process of analyzing an image or the process of generation of photographing advice information may be performed through the P2P connection between a device for photographing an image and a device for analyzing the image.

Moreover, the information processing unit 120 and the image processing unit 230 described above may have the configuration to execute an encoding process and a decoding process employing a scalable coding scheme as described below.

Figure 22:
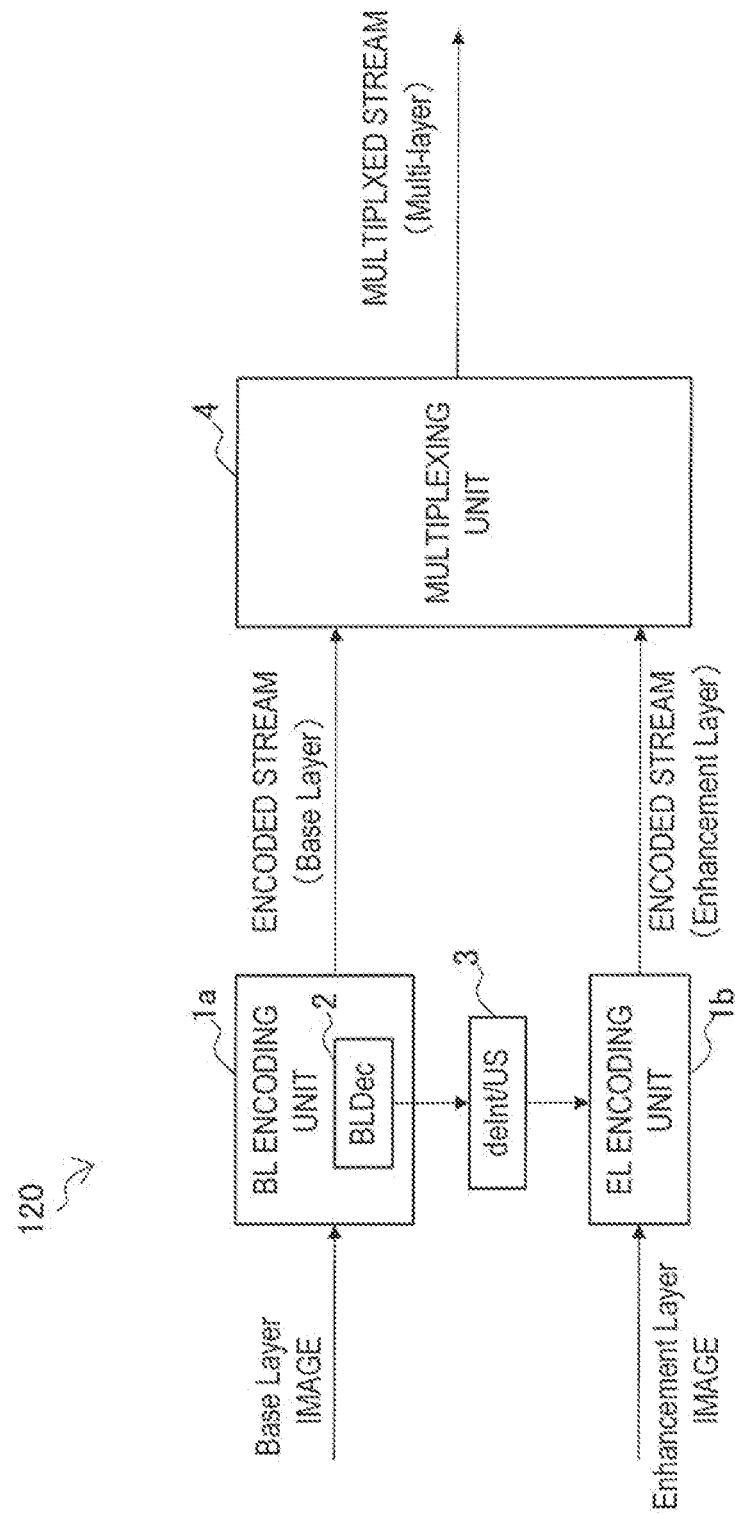
FIG. 22 is a block diagram illustrating a schematic configuration of an information processing unit according to an embodiment.

FIG. 22 is a block diagram illustrating a schematic configuration of the information processing unit 120 according to an embodiment which supports a scalable coding scheme in a mode, called BLR (spatial scalability using BL Reconstructed pixel only) mode, in which the independence for each layer is enhanced. The information processing unit 120 may support other types of scalable coding schemes. In addition, the information processing unit 120 may not support the scalable coding scheme (in this case, only a coding stream of a single layer can be encoded and decoded). Referring to FIG. 22, the information processing unit 120 is configured to include a BL encoding unit 1a, an EL encoding unit 1b, an intermediate processing unit 3, and a multiplexing unit 4.

The BL encoding unit 1a encodes a base-layer image to generate a base-layer encoded stream. The BL encoding unit 1a includes a local decoder 2. The local decoder 2 generates a base-layer reconstructed image. The intermediate processing unit 3 may function as a de-interlacing unit or upsampling unit. When a base-layer reconstructed image inputted from the BL encoding unit 1a is interlaced, the intermediate processing unit 3 de-interlaces the reconstructed image. In addition, the intermediate processing unit 3 performs upsampling on the reconstructed image according to the ratio of spatial resolution between the base layer and an enhancement layer. The process to be performed by the intermediate processing unit 3 may be omitted. The EL encoding unit 1b encodes an enhancement-layer image to generate an enhancement-layer encoded stream. As will be described in detail later, the EL encoding unit 1b, when encoding the enhancement-layer image, reuses the base-layer reconstructed image. The multiplexing unit 4 multiplexes the base-layer encoded stream generated by the BL encoding unit 1a and the enhancement-layer encoded stream generated by the EL encoding unit 1b, and then generates a multilayer multiplexed stream.

The information processing unit 120 shown in FIG. 22 is configured to perform the scalable coding process in the BLR mode. The configuration shown in FIG. 22 may also be included in the image processing unit 230.

Figure 23:
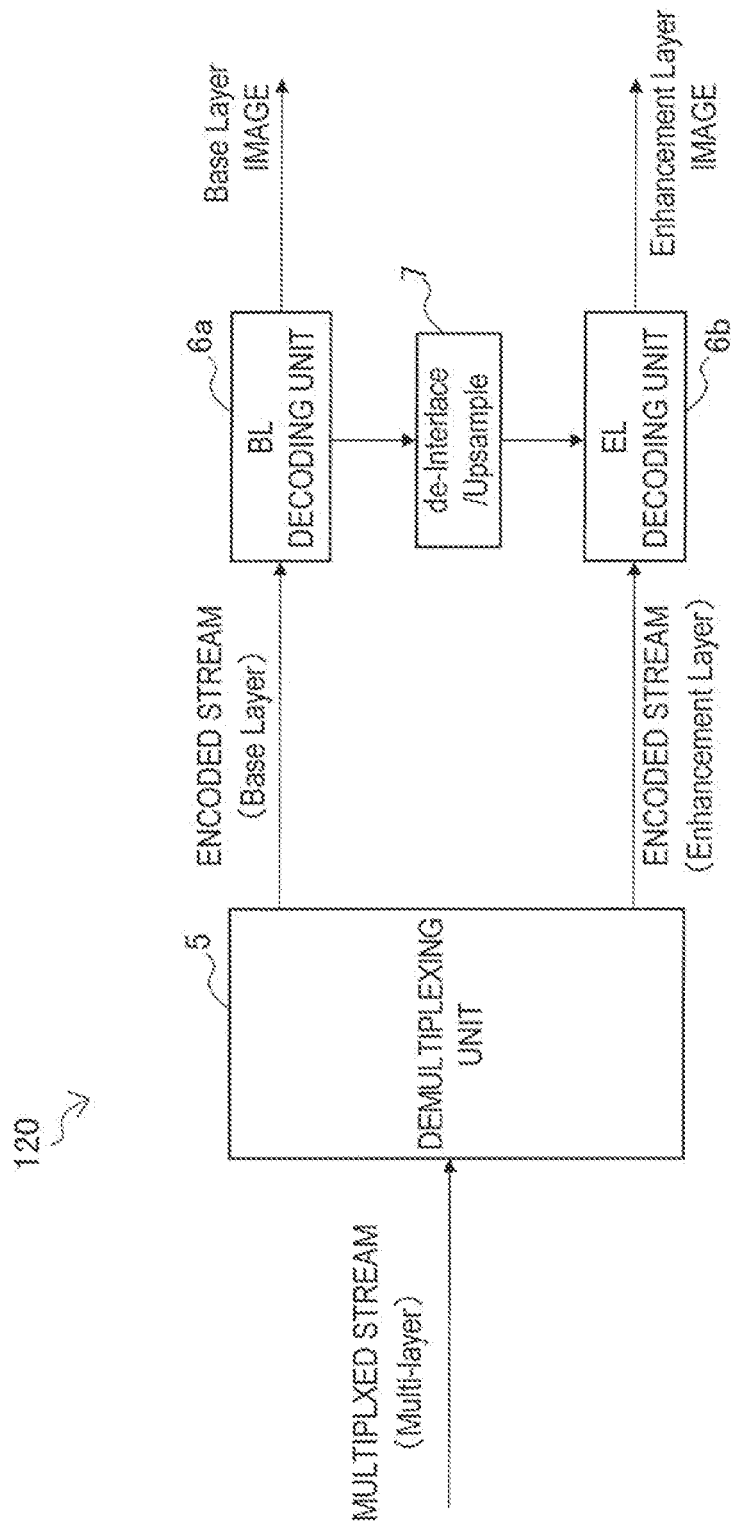
FIG. 23 is a block diagram illustrating a schematic configuration of an information processing unit according to an embodiment.

FIG. 23 is a block diagram illustrating a schematic configuration of the information processing unit 120 according to an embodiment which supports scalable coding in the BLR mode. Referring to FIG. 23, the information processing unit 120 is configured to include a demultiplexing unit 5, a BL decoding unit 6a, an EL decoding unit 6b, and an intermediate processing unit 7.

The demultiplexing unit 5 demultiplexes the multilayer multiplexed stream into a base-layer encoded stream and an enhancement-layer encoded stream. The BL decoding unit 6a decodes the base-layer encoded stream into the base-layer image. The intermediate processing unit 7 may function as a de-interlacing unit or upsampling unit. When a base-layer reconstructed image inputted from the BL decoding unit 6a is interlaced, the intermediate processing unit 7 de-interlaces the reconstructed image. In addition, the intermediate processing unit 7 performs upsampling on the reconstructed image according to the ratio of spatial resolution between the base layer and the enhancement layer. The process to be performed by the intermediate processing unit 7 may be omitted. The EL decoding unit 6b decodes the enhancement-layer encoded stream into the enhancement-layer image. As will be described in detail later, the EL decoding unit 6b, when decoding the enhancement-layer encoded stream into the enhancement-layer image, reuses the base-layer reconstructed image.

The information processing unit 120 shown in FIG. 23 is configured to perform decoding processing on the scalable coded data. The configuration shown in FIG. 23 may also be included in the image processing unit 230.

Figure 24:
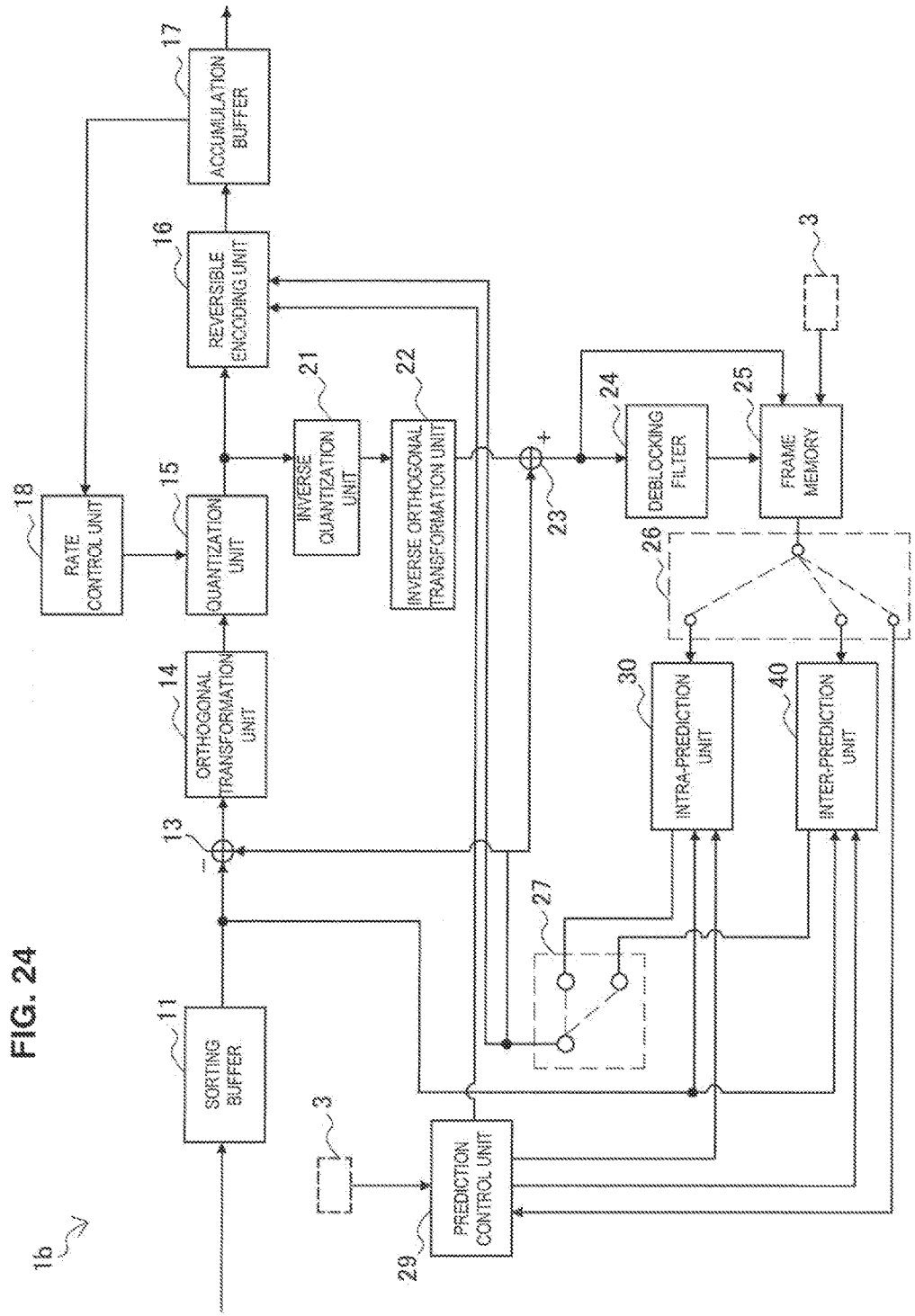
FIG. 24 is a block diagram illustrating an exemplary configuration of an EL encoding unit shown in FIG. 22.

FIG. 24 is a block diagram illustrating an exemplary configuration of the EL encoding unit 1b shown in FIG. 22. Referring to FIG. 24, the EL encoding unit 1b is configured to include a sorting buffer 11, a subtraction unit 13, an orthogonal transformation unit 14, a quantization unit 15, a reversible encoding unit 16, an accumulation buffer 17, a rate control unit 18, an inverse quantization unit 21, an inverse orthogonal transformation unit 22, an addition unit 23, a deblocking filter 24, a frame memory 25, selectors 26 and 27, a prediction control unit 29, an intra-prediction unit 30, and an inter-prediction unit 40.

The sorting buffer 11 sorts images included in a series of image data. The sorting buffer 11 sorts images according to GOP (group of pictures) structure related to an encoding process and then outputs the sorted image data to the subtraction unit 13, the intra-prediction unit 30, and the inter-prediction unit 40.

The subtraction unit 13 is supplied with the image data inputted from the sorting buffer 11 and is also supplied with predicted image data inputted from the intra-prediction unit 30 or the inter-prediction unit 40, which will be described later. The subtraction unit 13 calculates prediction error data that is the difference between the image data inputted from the sorting buffer 11 and the predicted image data, and outputs the calculated prediction error data to the orthogonal transformation unit 14.

The orthogonal transformation unit 14 performs an orthogonal transformation on the prediction error data inputted from the subtraction unit 13. An example of the orthogonal transformation to be performed by the orthogonal transformation unit 14 may include a discrete cosine transform (DCT) or Karhunen-Loève transform. The orthogonal transformation unit 14 outputs transformation coefficient data obtained by orthogonal transformation processing to the quantization unit 15.

The quantization unit 15 is supplied with the transformation coefficient data inputted from the orthogonal transformation unit 14 and is also supplied with a rate control signal from the rate control unit 18, which will be described later. The quantization unit 15 quantizes the transformation coefficient data and outputs the quantized transformation coefficient data (hereinafter, referred to as quantization data) to the reversible encoding unit 16 and the inverse quantization unit 21. In addition, the quantization unit 15 switches a quantization parameter (quantization scale) based on the rate control signal from the rate control unit 18 to change the bit rate of the quantization data.

The reversible encoding unit 16 performs reversible encoding processing on the quantization data inputted from the quantization unit 15 to generate an enhancement-layer encoded stream. In addition, the reversible encoding unit 16 encodes information on an intra-prediction or inter-prediction inputted from the selector 27 and multiplexes the encoded parameter onto a header region of the encoded stream. Then, the reversible encoding unit 16 outputs the generated encoded stream to the accumulation buffer 17.

The accumulation buffer 17 temporarily accumulates an encoded stream inputted from the reversible encoding unit 16 using a storage medium such as semiconductor memory. Then, the accumulation buffer 17 outputs accumulated encoded streams to a transmission unit (not shown) (for example, a communication interface or a connection interface to a peripheral device) at a rate in accordance with the band of the transmission line.

The rate control unit 18 monitors whether there is available capacity in the accumulation buffer 17. Then, the rate control unit 18 generates a rate control signal according to available capacity in the accumulation buffer 17 and outputs the generated rate control signal to the quantization unit 15. For example, when there is less available capacity in the accumulation buffer 17, the rate control unit 18 generates a rate control signal for decreasing the bit rate of the quantization data. In addition, for example, when there is sufficiently available capacity in the accumulation buffer 17, the rate control unit 18 generates a rate control signal for increasing the bit rate of the quantization data.

The inverse quantization unit 21, the inverse orthogonal transformation unit 22, and the addition unit 23 constitute a local decoder. The inverse quantization unit 21 performs an inverse quantization process on the quantization data inputted from the quantization unit 15. Then, the inverse quantization unit 21 outputs transformation coefficient data obtained by the inverse quantization process to the inverse orthogonal transformation unit 22.

The inverse orthogonal transformation unit 22 performs an inverse orthogonal transformation process on the transformation coefficient data inputted from the inverse quantization unit 21 to restore prediction error data. Then, the inverse orthogonal transformation unit 22 outputs the restored prediction error data to the addition unit 23.

The addition unit 23 adds the restored prediction error data inputted from the inverse orthogonal transformation unit 22 and the prediction image data inputted from the intra-prediction unit 30 or the inter-prediction unit 40 to generate decoded image data (an enhancement-layer reconstructed image). Then, the addition unit 23 outputs the generated decoded image data to the deblocking filter 24 and the frame memory 25.

The deblocking filter 24 performs a filtering process for reducing block distortion occurring at the time of encoding of an image. The deblocking filter 24 filters the decoded image data inputted from the addition unit 23 to remove the block distortion, and then the deblocking filter 24 outputs the decoded image data obtained after filtering to the frame memory 25.

The frame memory 25 stores, using a storage medium, the decoded image data inputted from the addition unit 23, the filtered decoded image data inputted from the deblocking filter 24, and the reconstructed image data of a base-layer inputted from the intermediate processing unit 3.

The selector 26 reads the decoded image data before filtering which is to be used to perform intra-prediction from the frame memory 25 and supplies the read decoded image data to the intra-prediction unit 30 as reference image data. In addition, the selector 26 reads the decoded image data after filtering which is to be used to perform inter-prediction from the frame memory 25 and supplies the read decoded image data to the intra-prediction unit 40 as reference image data. Additionally, the selector 26 outputs the base-layer reconstructed image data to the prediction control unit 29.

In an intra-prediction mode, the selector 27 outputs predicted image data, which is an intra-prediction result outputted from the intra-prediction unit 30, to the subtraction section 13 and outputs information regarding the intra-prediction to the reversible encoding unit 16. In addition, in an inter-prediction mode, the selector 27 outputs predicted image data, which is an inter-prediction result outputted from the inter-prediction unit 40, to the subtraction unit 13 and outputs the information regarding inter-prediction to the reversible encoding unit 16. The selector 27 switches between the inter-prediction mode and the intra-prediction mode depending on the variation of cost function value.

The prediction control unit 29 controls a prediction mode selected at the time when the intra-prediction unit 30 or the inter-prediction unit 40 generate an enhancement-layer predicted image, by using a base-layer reconstructed image generated by the local decoder 2 of the BL encoding unit 1a.

The intra-prediction unit 30 performs an intra-prediction process for each prediction unit (PU) of HEVC standard based on original image data and decoded image data of an enhancement layer. For example, the intra-prediction unit 30 evaluates a prediction result obtained in each candidate mode within a set of prediction modes controlled by the prediction control unit 29 using a predetermined cost function. Then, the intra-prediction unit 30 selects a prediction mode having the minimum cost function value, that is, the prediction mode having the highest compression ratio as an optimum prediction mode. In addition, the intra-prediction unit 30 generates enhancement-layer predicted image data according to the optimum prediction mode. Then, the intra-prediction unit 30 outputs intra-prediction related information, a cost function value, and predicted image data to the selector 27. The intra-prediction related information includes prediction mode information indicating the selected optimum prediction mode.

The inter-prediction unit 40 performs an inter-prediction process for each prediction unit of HEVC standard based on original image data and decoded image data of an enhancement layer. For example, the inter-prediction unit 40 evaluates a prediction result obtained in each candidate mode within a set of prediction modes controlled by the prediction control unit 29 using a predetermined cost function. Then, the inter-prediction unit 40 selects a prediction mode having the minimum cost function value, that is, the prediction mode having the highest compression ratio as an optimum prediction mode. In addition, the inter-prediction unit 40 generates enhancement-layer predicted image data according to the optimum prediction mode. Then, the inter-prediction unit 40 outputs intra-prediction related information, a cost function value, and predicted image data to the selector 27. The intra-prediction related information includes prediction mode information and motion information indicating the selected optimum prediction mode.

Figure 25:
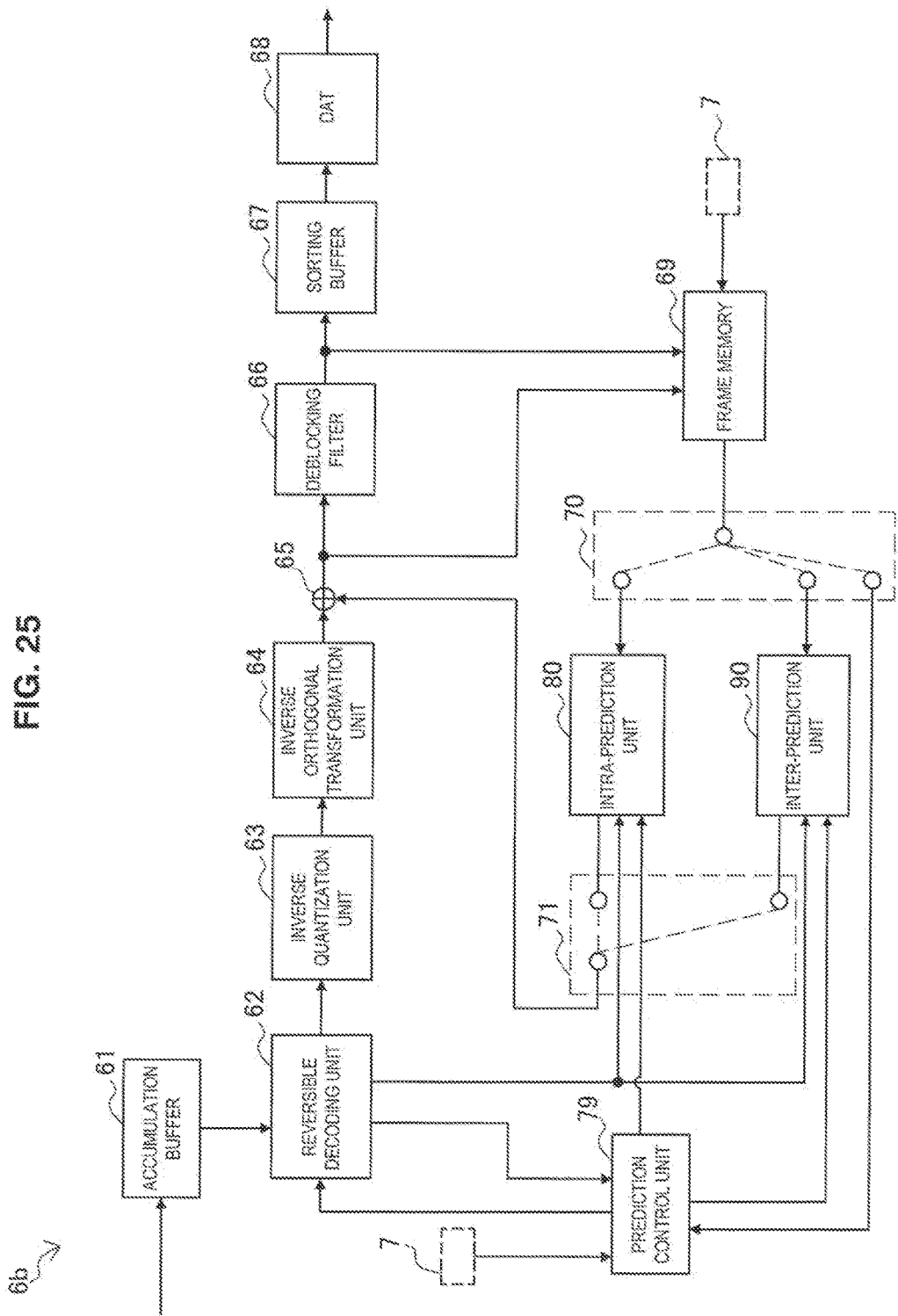
FIG. 25 is a block diagram illustrating an exemplary configuration of the EL decoding unit shown in FIG. 23.

FIG. 25 is a block diagram illustrating an exemplary configuration of the EL decoding unit 6b shown in FIG. 23. Referring to FIG. 25, the EL decoding unit 6b is configured to include an accumulation buffer 61, a reversible decoding unit 62, an inverse quantization unit 63, an inverse orthogonal transformation unit 64, an addition unit 65, a deblocking filter 66, a sorting buffer 67, a D/A (digital to analogue) conversion unit 68, a frame memory 69, selectors 70 and 71, a prediction control unit 79, an intra-prediction unit 80, and an inter-prediction unit 90.

The accumulation buffer 61 temporarily accumulates an enhancement-layer encoded stream that is inputted from the demultiplexing unit 5 using a storage medium.

The reversible decoding unit 62 decodes the enhancement-layer encoded stream that is inputted from the accumulation buffer 61 according to the encoding scheme used at the time of encoding. In addition, the reversible decoding unit 62 decodes information multiplexed in a header region of the encoded stream. An example of the information decoded by the reversible decoding unit 62 may include information related to the intra-prediction and information related to the inter-prediction described above. The reversible decoding unit 62 outputs the information related to the intra-prediction to the intra-prediction unit 80. In addition, the reversible decoding unit 62 outputs the information related to the inter-prediction to the inter-prediction unit 90.

The inverse quantization unit 63 inversely quantizes the quantized data obtained by decoding in the reversible decoding unit 62. The inverse orthogonal transformation unit 64 performs inverse orthogonal transformation on the transformation coefficient data inputted from the inverse quantization unit 63 according to the orthogonal transformation method used at the time of encoding, thereby generating prediction error data. Then, the inverse orthogonal transformation unit 64 outputs the generated prediction error data to the addition unit 65.

The addition unit 65 adds the prediction error data inputted from the inverse orthogonal transformation unit 64 and the prediction image data inputted from the selector 71 to generate decoded image data. Then, the addition unit 65 outputs the generated decoded image data to the deblocking filter 66 and the frame memory 69.

The deblocking filter 66 filters the decoded image data inputted from the addition unit 65 to remove block distortion, and then the deblocking filter 66 outputs the decoded image data obtained after filtering to the sorting buffer 67 and the frame memory 69.

The sorting buffer 67 sorts the images inputted from the deblocking filter 66 and thus generates a series of time series image data. Then, the sorting buffer 67 outputs the generated image data to the D/A converting unit 68.

The D/A converting unit 68 converts digital image data inputted from the sorting buffer 67 into an analog image signal. Then, the D/A converting unit 68 causes an enhancement-layer image to be displayed, for example, by outputting an analog image signal to a display (not shown) connected to the image decoding device 60.

The frame memory 69 stores, using a storage medium, the decoded image data before filtering inputted from the addition unit 65, the decoded image data after filtering inputted from the deblocking filter 66, and the base-layer reconstructed image data inputted from the intermediate processing unit 7.

The selector 70 switches an output destination of the image data provided from the frame memory 69 between the motion compensation section 80 and the intra prediction section 90 for each block in the image according to mode information obtained by the reversible decoding unit 62. For example, in the case where the intra-prediction mode is specified, the selector 70 outputs the decoded image data before filtering that is supplied from the frame memory 69 to the intra-prediction unit 80 as reference image data. In addition, in the case where the inter-prediction mode is specified, the selector 70 outputs the decoded image data after filtering to the inter-prediction unit 90 as reference image data, and the selector 70 outputs base-layer reconstructed image data to the prediction control unit 79.

The selector 71 switches the output source of predicted image data to be supplied to the addition unit 65 between the intra-prediction unit 80 and the inter-prediction unit 90 according to mode information obtained by the reversible decoding unit 62. For example, in the case where the intra-prediction mode is specified, the selector 71 supplies the predicted image data outputted from the intra-prediction unit 80 to the addition unit 65. In addition, in the case where the inter-prediction mode is specified, the selector 71 supplies the predicted image data outputted from the inter-prediction unit 90 to the addition section 65.

The prediction control unit 79 controls a prediction mode selected at the time when the intra-prediction unit 80 and the inter-prediction unit 90 generate an enhancement-layer predicted image using a base-layer reconstructed image generated by the BL decoding unit 6*a*.

The intra-prediction unit 80 performs an enhancement-layer intra-prediction process based on the information regarding intra-prediction inputted from the reversible decoding unit 62 and the reference image data from the frame memory 69 and thus generates predicted image data. Then, the intra-prediction unit 80 outputs the generated enhancement-layer predicted image data to the selector 71.

The inter-prediction unit 90 performs an enhancement-layer motion compensation process based on the information regarding inter-prediction inputted from the reversible decoding unit 62 and the reference image data from the frame memory 69, and thus generates predicted image data. Then, the inter-prediction unit 90 outputs the generated enhancement-layer predicted image data to the selector 71.

The information processing unit 120 has the configuration which performs encoding and decoding processes using scalable coding as described above, and thus when the format or bit rate of a moving image is changed, it is possible to perform transcoding and transrating. In addition, the image processing unit 230 has the configuration which performs an encoding process using scalable coding as described above, and thus it is possible to compress and record a photographed image. Additionally, the image processing unit 230 has the configuration which performs a decoding process on an image encoded by scalable coding as described above, and thus it is possible to output the compressed and recorded image to the display unit 250.

Steps in processes executed by devices in this specification are not necessarily executed chronologically in the order described in a sequence chart or a flow chart. For example, steps in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

Additionally, the present technology may also be configured as below.

(1)

An imaging control device including:

a result receiving unit configured to receive an example image selected by an image processing device used for image processing using image information, the image information being information regarding an image captured by an imaging unit used for image capturing;

a selection result transmitting unit configured to transmit information regarding the example image received by the result receiving unit to the image processing device;

a setting receiving unit configured to receive setting information generated by the image processing device based on the example image transmitted from the selection result transmitting unit, the setting information indicating a setting condition when image capturing is performed like the example image; and a setting change unit configured to change an imaging setting of the imaging unit using the setting information received by the setting receiving unit.

(2)

The imaging control device according to (1), further including:

an image processing unit configured to analyze an image captured by the imaging unit, wherein the image information includes a result obtained by analysis in the image processing unit.

(3)

The imaging control device according to (2), wherein the image processing unit extracts a feature value of an image captured by the imaging unit.

(4)

The imaging control device according to any of (1) to (3), wherein the image information includes environmental information when an image on which the image information is based is captured.

(5)

The imaging control device according to any of (1) to (4), wherein the image information includes equipment information when an image on which the image information is based is captured.

(6)

The imaging control device according to any of (1) to (5), wherein, as the image information, information is included regarding a user when an image on which the image information is based is captured.

(7)

The imaging control device according to (6), wherein the information regarding the user includes information indicating a history of imaging by the user.

(8)

The imaging control device according to (6) or (7), wherein the information regarding the user includes information indicating taste and preference of the user.

(9)

The imaging control device according to any of (6) to (8), wherein the information regarding the user includes biometric information of the user.

(10)

The imaging control device according to any of (1) to (9), wherein the setting information received by the setting information includes information regarding content of a subject included in an image to be captured by the imaging unit.

(11)

The imaging control device according to any of (1) to (10), wherein the setting information received by the setting information includes information regarding an imaging position of an image to be captured by the imaging unit.

(12)

The imaging control device according to any of (1) to (11), wherein the setting information received by the setting information includes information regarding an imaging time of an image to be captured by the imaging unit.

(13)

The imaging control device according to any of (1) to (12), further including:

an image display unit configured to display one or more example images received by the result receiving unit.

(14)

The imaging control device according to (13), wherein the image display unit displays, in association with a map, a location where one or more example images received by the result receiving unit are captured.

(15)

The imaging control device according to any of (1) to (14), further including:

an imaging unit configured to capture the image.

(16)

The imaging control device according to any of (1) to (15), further including:
an image information transmitting unit configured to transmit the image information to the image processing device.

(17)

An image processing device including:
an example image retrieval unit configured to acquire an example image using image information transmitted from an imaging control device used to change an imaging setting of an imaging unit used for image capturing, the image information being information regarding an image captured by the imaging unit;
an example image transmitting unit configured to transmit the example image acquired by the example image retrieval unit to the imaging control device;
a setting generation unit configured to generate setting information indicating a setting condition when image capturing is performed like the example image, based on information regarding the example image selected by the imaging control device from among the example images transmitted from the example image transmitting unit and transmitted from the imaging control device; and
a setting transmitting unit configured to transmit the setting information generated by the setting generation unit to the imaging control device.

(18)

An imaging controlling method including:
receiving an example image selected by an image processing device used for image processing using image information, the image information being information regarding an image captured by a imaging unit used for image capturing;
transmitting information regarding the received example image to the image processing device;
receiving setting information generated by the image processing device based on the transmitted example image, the setting information indicating a setting condition when image capturing is performed like the example image; and
changing an imaging setting of the imaging unit using the received setting information.

(19)

An image processing method including:
acquiring an example image using image information transmitted from an imaging control device used to change an imaging setting of an imaging unit used for image capturing, the image information being information regarding an image captured by the imaging unit;
transmitting the acquired example image to the imaging control device;
generating setting information indicating a setting condition when image capturing is performed like the example image, based on information regarding the example image selected by the imaging control device from among the transmitted example images and transmitted from the imaging control device; and
transmitting the generated setting information to the imaging control device.

REFERENCE SIGNS LIST 1 information processing system
10 network
100 photographing advice server
110 receiving unit
120 information processing unit
121 data analysis unit
122 advice generation unit
123 camera setting generation unit
130 transmitting unit
140 database
151 feature value data receiving unit
152 feature value comparison unit
153 model database
161 recognition result acquisition unit
162 example image retrieval unit
163 presentation information generation unit
164 advice information transmitting unit
165 model database
200 digital camera
210 lens unit
220 imaging element
230 image processing unit
231 image input unit
232 image information generation unit
233 image information transmitting unit
240 sensor unit
250 display unit
251 processing execution unit
252 presentation unit
260 storage unit
270 transmitting unit
280 receiving unit
281 image feature value extraction unit
282 meta-information acquisition unit
291 result receiving unit
292 result display unit
293 selection result transmitting unit
294 camera setting receiving unit
295 camera setting change unit
296 assist information presentation unit
1100 image recognition server
1121 data receiving unit
1122 feature comparison unit
1123 data transmitting unit
1200 digital camera
1231 image input unit
1232 image feature value extraction unit
1233 feature value transmitting unit
1234 recognition result receiving unit
1235 recognition result acquisition unit
1236 recognition result display unit

The invention claimed is:

1. An imaging control device comprising:
circuitry configured to
receive an example image selected by an image processing unit or by a user, wherein the example image is used for image processing;
acquire setting information based on example image information, the setting information indicating a setting condition when image capturing is performed like the example image; and
change an imaging setting of an imaging unit used for image capturing using the acquired setting information.

2. The imaging control device according to claim 1, wherein the circuitry is further configured to
analyze an image captured by the imaging unit, and
wherein the image information includes a result obtained by the analysis of the captured image.

3. The imaging control device according to claim 2, wherein the analysis extracts a feature value of the image captured by the imaging unit.

4. The imaging control device according to claim 1, wherein the image information includes environmental information when an image on which the image information is based is captured.

5. The imaging control device according to claim 1, wherein the image information includes equipment information when an image on which the image information is based is captured.

6. The imaging control device according to claim 1, wherein as the image information, information is included regarding a user when an image on which the image information is based is captured.

7. The imaging control device according to claim 6, wherein the information regarding the user includes information indicating a history of imaging by the user.

8. The imaging control device according to claim 6, wherein the information regarding the user includes information indicating taste and preference of the user.

9. The imaging control device according to claim 6, wherein the information regarding the user includes biometric information of the user.

10. The imaging control device according to claim 1, wherein the acquired setting information includes information regarding content of a subject included in the image captured by the imaging unit.

11. The imaging control device according to claim 1, wherein the acquired setting information includes information regarding an imaging position of the image captured by the imaging unit.

12. The imaging control device according to claim 1, wherein the acquired setting information includes information regarding an imaging time of the image captured by the imaging unit.

13. The imaging control device according to claim 1, wherein the circuitry is further configured to
initiate display of one or more received example images.

14. The imaging control device according to claim 13, wherein a location where the one or more received example images are captured is displayed in association with a map.

15. The imaging control device according to claim 1, wherein the circuitry is further configured to
initiate a capture of the image.

16. The imaging control device according to claim 1, wherein the circuitry is further configured to
transmit the image information to the image processing device.

17. An image processing device comprising:
circuitry configured to
acquire an example image using image information transmitted from an imaging control device used to change an imaging setting of an imaging unit used for image capturing, the image information being information regarding an image captured by the imaging unit;
generate setting information indicating a setting condition when image capturing is performed like the example image, based on information regarding the acquired example image;
transmit the generated setting information to the imaging control device; and
change an imaging setting of the imaging unit using the generated setting information.

18. An imaging controlling method, implemented via at least one processor, the method comprising:
receiving an example image selected by an image processing device use for image processing using image information, the image information being information regarding an image captured by an imaging unit used for image capturing;
transmitting information regarding the received example image to the image processing device;
receiving setting information generated by the image processing device based on the transmitted example image, the setting information indicating a setting condition when image capturing is performed like the example image; and
changing an imaging setting of the imaging unit using the received setting information.

19. A non-transitory computer-readable medium having embodied thereon a program, which when executed by a computer causes the computer to execute an image processing method, the method comprising:
acquiring an example image used to change a setting of an image captured by an imaging unit;
acquiring setting information indicating a setting condition used for processing the image like the example image, based on information regarding the example image; and
changing the setting of the imaging unit using the acquired setting information.

20. The non-transitory computer-readable medium according to claim 19, wherein the setting information comprises positions, composition, illumination, tone, or diaphragm of the image.

* * * * *